US009077572B1

(12) United States Patent
Hueda et al.

(10) Patent No.: US 9,077,572 B1
(45) Date of Patent: Jul. 7, 2015

(54) RESET IN A RECEIVER USING CENTER OF GRAVITY OF EQUALIZER COEFFICIENTS

(71) Applicant: ClariPhy Communications, Inc., Irvine, CA (US)

(72) Inventors: Mario Rafael Hueda, Córdoba (AR); Alfredo Taddei, Córdoba (AR); Diego Ernesto Crivelli, Córdoba (AR); Hugo Santiago Carrer, Mendiolaza (AR); Oscar Ernesto Agazzi, Irvine, CA (US); Norman L. Swenson, Mountain View, CA (US); Thomas A. Lindsay, Brier, WA (US); Jinwoo Cho, Palo Alto, CA (US); Daniel Tauber, Palo Alto, CA (US)

(73) Assignee: ClariPhy Communications, Inc., Irvine, CA (US)

( * ) Notice: Subject to any disclaimer, the term of this patent is extended or adjusted under 35 U.S.C. 154(b) by 0 days.

(21) Appl. No.: 13/744,235

(22) Filed: Jan. 17, 2013

Related U.S. Application Data

(60) Provisional application No. 61/587,572, filed on Jan. 17, 2012, provisional application No. 61/677,460, filed on Jul. 30, 2012, provisional application No. 61/683,169, filed on Aug. 14, 2012, provisional application No. 61/704,490, filed on Sep. 22, 2012, provisional application No. 61/745,389, filed on Dec. 21, 2012.

(51) Int. Cl.
*H03H 7/30* (2006.01)
*H03H 7/40* (2006.01)
(Continued)

(52) U.S. Cl.
CPC ....................................... *H04L 25/03* (2013.01)

(58) Field of Classification Search
USPC .......................................................... 375/232
See application file for complete search history.

(56) References Cited

U.S. PATENT DOCUMENTS

| | | | | |
|---|---|---|---|---|
| 4,815,103 A | * | 3/1989 | Cupo et al. .................... | 375/234 |
| 5,353,312 A | * | 10/1994 | Cupo et al. .................... | 375/354 |
| 5,870,372 A | | 2/1999 | Kuribayashi | |

(Continued)

OTHER PUBLICATIONS

El-Chammas, M. et al., "A 12-Gs/s 81-mW 5-bit Time-Interleaved Flash ADC With Background Timing Skew Calibration," *IEEE Journal Solid-State Circuits*, Apr. 2011, pp. 838-847, vol. 46, No. 4.

(Continued)

*Primary Examiner* — Erin File
(74) *Attorney, Agent, or Firm* — Fenwick & West LLP

(57) ABSTRACT

A receiver applies a calibration method to compensate for skew between input channels. The receiver skew is estimated by observing the coefficients of an adaptive equalizer which adjusts the coefficients based on time-varying properties of the multi-channel input signal. The receiver skew is compensated by programming the phase of the sampling clocks for the different channels. Furthermore, during real-time operation of the receiver, channel diagnostics is performed to automatically estimate differential group delay and/or other channel characteristics based on the equalizer coefficients using a frequency averaging or polarization averaging approach. Framer information can furthermore be utilized to estimate differential group delay that is an integer multiple of the symbol rate. Additionally, a DSP reset may be performed when substantial signal degradation is detected based on the channel diagnostics information.

16 Claims, 13 Drawing Sheets

(51) Int. Cl.
*H03K 5/159* (2006.01)
*H04L 25/03* (2006.01)

(56) References Cited

U.S. PATENT DOCUMENTS

| | | | |
|---|---|---|---|
| 6,791,995 B1* | 9/2004 | Azenkot et al. | 370/436 |
| 7,693,214 B2 | 4/2010 | Shida | |
| 8,077,762 B2* | 12/2011 | Agazzi | 375/219 |
| 8,565,621 B2 | 10/2013 | Ibragimov et al. | |
| 8,687,974 B2 | 4/2014 | Zelensky et al. | |
| 8,731,413 B1 | 5/2014 | Dave et al. | |
| 8,873,358 B2 | 10/2014 | Saito et al. | |
| 2007/0206963 A1 | 9/2007 | Koc | |
| 2008/0175590 A1 | 7/2008 | Perkins et al. | |
| 2009/0110046 A1* | 4/2009 | Aziz et al. | 375/232 |
| 2010/0008413 A1* | 1/2010 | Yamazaki et al. | 375/232 |
| 2011/0064421 A1 | 3/2011 | Zhang et al. | |
| 2011/0150506 A1 | 6/2011 | Tanimura et al. | |
| 2011/0229127 A1 | 9/2011 | Sakamoto et al. | |
| 2012/0230676 A1* | 9/2012 | Mo et al. | 398/25 |
| 2012/0257652 A1 | 10/2012 | Malipatil et al. | |
| 2012/0307025 A1* | 12/2012 | Werner Lerche et al. | 348/61 |
| 2013/0051442 A1* | 2/2013 | Cooper et al. | 375/222 |
| 2013/0084080 A1 | 4/2013 | Shibutani | |
| 2013/0209089 A1 | 8/2013 | Harley et al. | |
| 2013/0243127 A1 | 9/2013 | Chmelar et al. | |
| 2013/0251082 A1 | 9/2013 | Abe | |
| 2013/0259490 A1 | 10/2013 | Malouin et al. | |
| 2013/0343490 A1 | 12/2013 | Wertz et al. | |
| 2014/0161470 A1 | 6/2014 | Zelensky et al. | |
| 2014/0254644 A1 | 9/2014 | Gotman et al. | |

OTHER PUBLICATIONS

Geyer, J.C. et al., "Optical Performance Monitoring using a 43Gb/s Realtime Coherent Receiver (Invited)," *IEEE*, 2009, pp. 93-94.

Geyer, J.C. et al., "Performance Monitoring Using Coherent Receivers," *IEEE*, 2009, three pages.

Greshishchev, Y. et al., "A 40GS/s 6b ADC in 65nm CMOS," ISSCC Dig. *IEEE International Solid-State Circuits Conference*, 2010, pp. 390-392.

Hauske, F. et al., "Optical Performance Monitoring in Digital Coherent Receivers," *Journal of Lightwave Technology*, Aug. 15, 2009, pp. 3623-3631, vol. 27, No. 16.

Leven, A. et al., "Real-Time Implementation of Digital Signal Processing for Coherent Optical Digital Communication Systems," *IEEE Journal of Selected Topics in Quantum Electronics*, Sep./Oct. 2010, pp. 1227-1234, vol. 16, No. 5.

Nelson, L. et al., "Performance of 46-Gbps Dual-Polarization QPSK Transceiver With Real-Time Coherent Equalization Over High PMD Fiber," *J. Lightwave Tech.*, Feb. 2009, pp. 158-167, vol. 27, No. 3.

Viterbi, A. et al., "Nonlinear Estimation of PSK-Modulated Carrier Phase with Application to Burst Digital Transmission," *IEEE Transactions on Information Theory*, Jul. 1983, pp. 543-551, vol. 29, No. 4.

* cited by examiner

RESET IN A RECEIVER USING CENTER OF GRAVITY OF EQUALIZER COEFFICIENTS

RELATED APPLICATIONS

This application claims the benefit of the following U.S. Provisional Applications: U.S. Provisional Patent Application Ser. No. 61/587,572 entitled "Automatic Skew Compensation Scheme Based on FFE Coefficients," filed on Jan. 17, 2012 to Shih Cheng Wang; U.S. Provisional Application No. 61/677,460 entitled "Feed-Forward Equalizer Center-of-Gravity Monitoring in High-Speed Optical Communications Networks" filed on Jul. 30, 2012 to Mario R. Hueda, et al.; U.S. Provisional Patent Application Ser. No. 61/683,169 entitled "Automatic Receiver Deskew Procedure," filed on Aug. 14, 2012 to Diego Crivelli, et al; U.S. Provisional Patent Application Ser. No. 61/704,490 entitled "Method Using Frequency Domain Averaging to Calculate Impairments in a Fiber-Optic Channel to Invert an FFE Matrix," filed on Sep. 22, 2012 to Shih Cheng Wang, et al.; and U.S. Provisional Application No. 61/745,389 entitled "Method of Estimating Channel Performance Using Equalizer Tap Coefficients and Framer Information" filed on Dec. 21, 2012 to Shih Cheng Wang, et al. The contents of each of the above referenced applications are incorporated by reference herein in their entirety.

This application is related to the following applications: U.S. Utility application Ser. No. 13/744,211 entitled "Channel Diagnostics Based on Equalizer Coefficients" filed on Jan. 17, 2013 to Shih Cheng Wang, et al.; and U.S. Utility application Ser. No. 13/744,205 entitled "Skew Compensation Based on Equalizer Coefficients" filed on Jan. 17, 2013 to Shih Cheng Wang, et al. The contents of each of the above referenced applications are incorporated by reference herein in their entirety.

BACKGROUND

1. Field of the Art

The disclosure relates generally to communication systems, and more specifically, to using equalizer coefficients to improve performance and diagnostics in an optical receiver system.

2. Description of the Related Art

Optical communication systems typically communicate data over a plurality of channels corresponding to different phases and/or polarizations of the optical signal. For example, in a dual-polarization coherent optical communication system, data is communicated over four channels: (1) a horizontally polarized in-phase (HI) channel; (2) a horizontally polarized quadrature (HQ) channel; (3) a vertically polarized in-phase (VI) channel; and (4) a vertically polarized quadrature (VQ) channel. While the data communicated over the different channels is typically aligned relative to a common clock when transmitted by the transmitter, delay (or skew) may be introduced into one or more of the channels based on characteristics of the transmitter, receiver, and/or the optical fiber. As a result, the relative timing of the data in the various channels may be misaligned at the receiver, causing degradation of the recovered data.

SUMMARY

An optical communication system receives a digital input vector. The digital signal vector is equalized using an adaptive equalizer to generate an equalized signal vector. The adaptive equalizer adaptively updates equalizer coefficients based on characteristics of the digital signal vector. The optical communication system determines whether or not to reset the digital signal processor based on an evaluation of at least one center of gravity of the equalizer coefficients. Resetting the digital signal processor causes adaptive algorithms performed by the digital signal processor to restart with different initial conditions, thus converging to a different solution which may provide improved performance.

In one embodiment, a center of gravity is determined for the equalizer coefficients. The center of gravity is compared to a predefined range. The digital signal processor is reset responsive to the center of gravity falling outside the predefined range.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Overview

The disclosed embodiments generally relate to improving performance of coherent communication systems that employ electronic equalization of communication channels in the receiver. In a first aspect, a receiver performs an automatic skew calibration to compensate for skew between different input channels during a calibration stage of the receiver. The receiver skew is estimated by observing the coefficients of an adaptive equalizer, which adjusts the coefficients based on time-varying properties of the multi-channel input signal. The receiver compensates for the estimated skew by adjusting the phases of the sampling clocks for the different channels.

In a second aspect, the receiver performs channel diagnostics to extract channel information from the equalizer coefficients. The channel information can be used to automatically estimate differential group delay introduced by channel impairments during real-time operation. The differential group delay is accurately estimated based on the equalizer coefficients using a frequency averaging approach. Framer information can furthermore be utilized to estimate differential group delay that is an integer multiple of the symbol rate. The diagnostics information may also be used to reset the device when substantial performance degradation is detected.

High Level System Architecture

Figure 1:
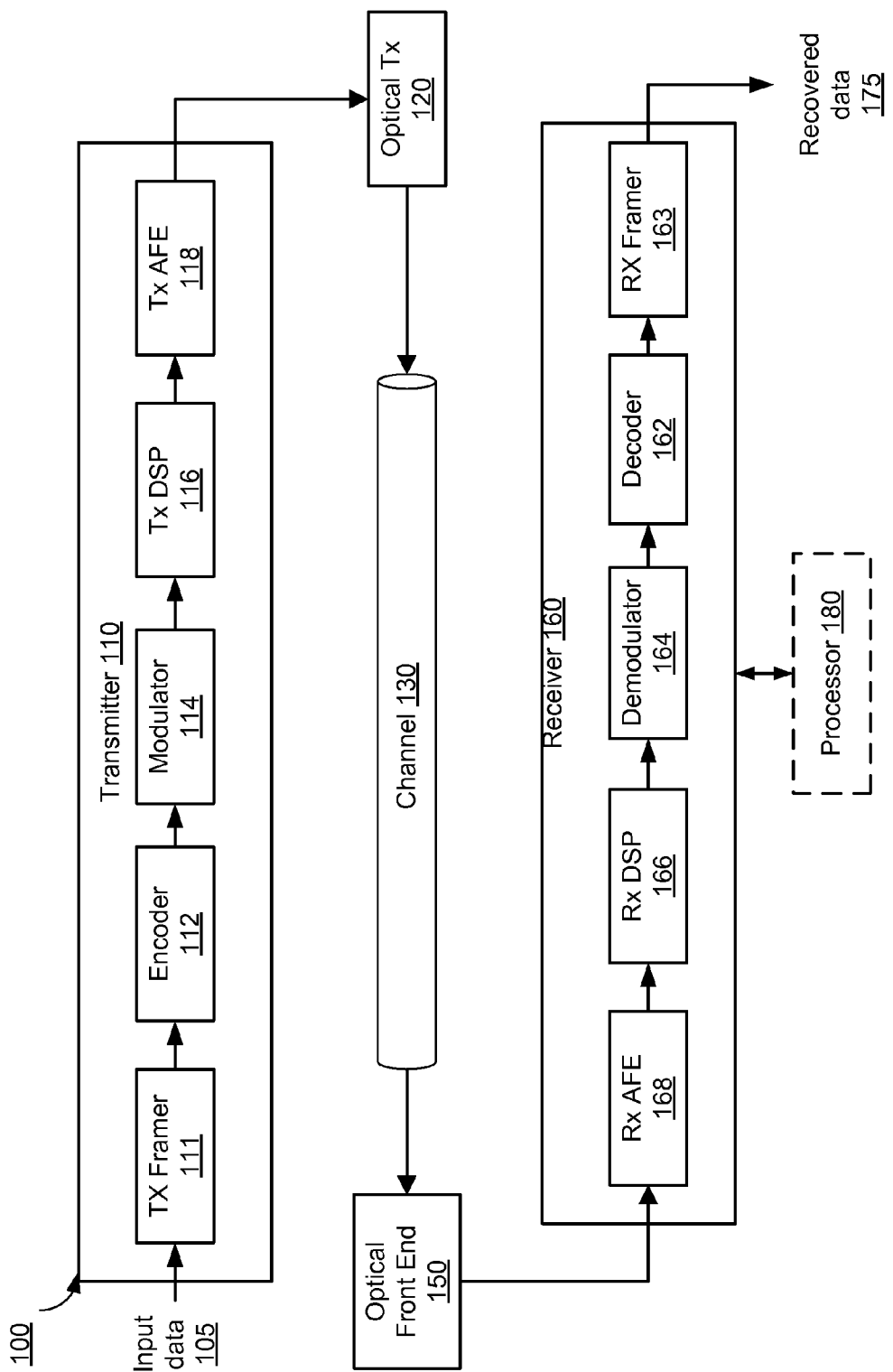
FIG. 1 is a block diagram illustrating an embodiment of an optical communication system.

FIG. 1 is a block diagram of a communication system 100. The communication system 100 comprises a transmitter 110 for encoding data as an electrical signal, an optical transmitter 120 for converting the electrical signal produced by the transmitter 110 to an optical signal suitable for transmission over a communication channel 130, an optical front end 150 for converting the received optical signal to an electrical signal, and a receiver 160 for receiving and processing the electrical signal encoding the data from the optical front end 150. Optionally, a separate processor 180 may be coupled to the receiver 160 to perform skew calibration and channel diagnostics as will be described below. In one embodiment, the communication system 100 comprises an ultra-high speed (e.g., 40 Gb/s or faster) optical fiber communication system, although the described techniques may also be applicable to lower speed optical communication systems.

The transmitter 110 comprises a transmitter (Tx) framer 111, an encoder 112, a modulator 114, a Tx digital signal processor (DSP) 116, and a Tx analog front end (AFE) 118. The Tx framer 111 receives input data 105 from a host interface and formats the data for processing by the transmitter 110. The encoder 112 encodes the framed data for transmission over the optical network. For example, in one embodiment, the encoder 112 encodes the input data 105 using forward error correction (FEC) codes that will enable the receiver 160 to detect, and in many cases, correct errors in the data received over the channel 130. The modulator 114 modulates the encoded data via one or more carrier signals for transmission over the channel 130. For example, in one embodiment, the modulator 114 applies phase-shift keying (PSK) or different phase-shift keying (DPSK) to the encoded data. The Tx DSP 116 adapts (by filtering, etc.) the modulator's output signal according to the channel characteristics in order to improve the overall performance of the transmitter 110. The Tx AFE 118 further processes and converts the Tx DSP's digital output signal to the analog domain before it is passed to the optical transmitter (Optical Tx) 120 where it is converted to an optical signal and transmitted via the channel 130. One example of the optical transmitter 120 transmits independent modulations on both polarizations of the optical carrier. Example modulations are binary phase shift keying (BPSK) and quadrature phase-shift keying (QPSK), though other modulations can be used, and the choice can be made to transmit on either one or both polarizations. Additional example modulations include differential BPSK (DBPSK) and differential QPSK (DQPSK).

In addition to the illustrated components, the transmitter 110 may comprise other conventional features of a transmitter 110 which are omitted from FIG. 1 for clarity of description. Furthermore, in one embodiment, the transmitter 110 is embodied as a portion of a transceiver device that can both transmit and receive over the channel 130.

The channel 130 may have a limited frequency bandwidth and may act as a filter on the transmitted data. Transmission over the channel 130 may add noise to the transmitted signal including various types of random disturbances arising from outside or within the communication system 100. Furthermore, the channel 130 may introduce fading and/or attenuation effects to the transmitted data. Additionally, the channel 130 may introduce chromatic dispersion (CD) and polarization mode dispersion (PMD) effects that cause a distortion of the signals transmitted through the channel 130.

The optical front end 150 receives the optical signal from the channel 130, converts the optical signal to an electrical signal, and passes the electrical signal to the receiver 160. The receiver 160 receives the encoded and modulated data from the transmitter 110 via the optical transmitter 120, communication channel 130, and optical front end 150, and produces recovered data 175 representative of the input data 105. The receiver 160 includes a receiver (Rx) analog front end (AFE) 168, an RX DSP 166, a demodulator 164, a decoder 162, and an Rx framer 163. The Rx AFE 168 samples the analog signal from the optical front end 150 based on a clock signal 181 to convert the signal to the digital domain. The Rx DSP 166 further processes the digital signal by applying one or more filters to improve signal quality. The demodulator 164 receives the modulated signal from the Rx DSP 166 and demodulates the signal. The decoder 162 decodes the demodulated signal (e.g., using error correction codes). The Rx framer 163 aligns and formats the decoded data for synchronization with a host interface that receives the recovered input data 105.

In addition to the illustrated components, the receiver 160 may comprise other conventional features of a receiver 160 which are omitted from FIG. 1 for clarity of description. Furthermore, in one embodiment, the receiver 160 is embodied as a portion of a transceiver device that can both transmit and receive over the channel 130.

Components of the transmitter 110 and the receiver 160 described herein may be implemented, for example, as an integrated circuit (e.g., an Application-Specific Integrated Circuit (ASIC) or using a field-programmable gate array (FPGA), in software (e.g., loading program instructions to a processor (e.g., a microprocessor or a digital signal processor (DSP)) from a computer-readable storage medium and executing the instructions by the processor), or by a combination of hardware and software.

Figure 2A:
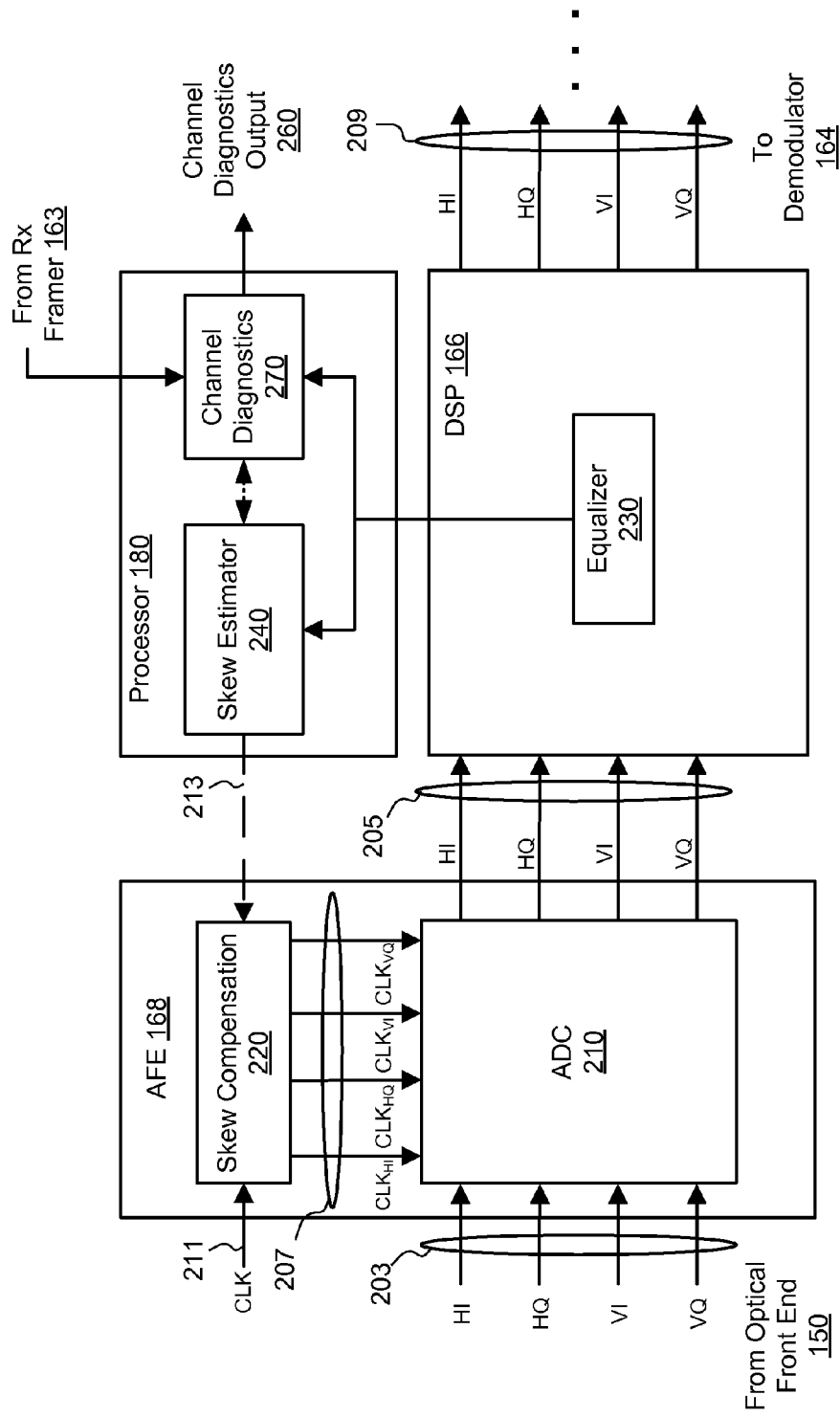
FIG. 2A is a block diagram illustrating a first embodiment of system for performing skew calibration.

FIG. 2A is a block diagram illustrating an embodiment of the Rx AFE 168 and Rx DSP 166 in further detail. The analog front end 168 receives an analog input signal vector 203. In one embodiment, the analog input signal vector 203 comprises four channels: (1) a horizontally polarized in-phase (HI) channel; (2) a horizontally polarized quadrature (HQ) channel; (3) a vertically polarized in-phase (VI) channel; and (4) a vertically polarized quadrature (VQ) channel. The analog front end 168 samples the analog input signal vector 203 to generate a digital signal vector 205. A digital signal processor 166 receives the digital signal vector 205 and performs various processing operations to generate an output signal vector 209 that is passed to the demodulator 164.

The physical characteristics of the transmitter 110 or receiver 160 (or both) may introduce skew between the various channels HI, HQ, VI, VQ in the digital signal vector 205 if left uncompensated. For example, skew between the HI and HQ channels or between the VI and VQ channels may introduce error in the quadrature phase relationships between the signals (i.e., the phase difference between the signals may vary from the expected 90° relationship). Furthermore, skew between the horizontal and vertical polarizations may be introduced that appear as a differential group delay (DGD) between the polarizations. The receiver 160 includes various components to compensate for this skew, thereby improving performance of the receiver 160.

In the AFE 168, a multi-channel analog-to-digital converter (ADC) 210 samples the analog input signal vector 203 to generate a digital signal vector 205. Each channel of the analog input signal 203 is sampled by the ADC 210 according to sampling clocks 207 which each corresponding to a different channel of the analog input signal 203 (e.g., sampling clocks $CLK_{HI}$, $CLK_{HQ}$, $CLK_{VI}$, $CLK_{VQ}$). By varying the relative phases of the sampling clocks 207, the different channels of the analog input signal 203 can be sampled with different relative timings, thereby compensating for skew.

A skew compensation block 220 generates the sampling clocks 207 for each channel based on an input clock signal 211. Based on a programmed level of skew compensation for each channel, the skew compensation block 211 adjusts the phase of the input clock signal 211 separately for each channel to generate each of the sampling clocks 207. For example, in one embodiment, the skew compensation block 220 comprises four programmable phase interpolators, one for each of the four channels. The phase interpolator for a given channel includes a programmable skew compensation register that can be programmed to introduce a particular amount of phase shift to the sampling clock for that channel. Based on the programmed value, the phase interpolator applies a phase shift to the input clock signal 211 to generate the sampling clock for the corresponding channel, thus compensating for the detected skew. Values for the skew compensation registers in the skew compensation block 220 may be programmed via a control signal 213 during a calibration phase described below. In one embodiment, this calibration phase is performed during an initial set up of the receiver at the beginning of its lifetime. Additionally, the receiver 160 may be recalibrated at later times (e.g., during a service call) by re-performing the calibration. Typically, the calibration is performed under ideal or near ideal laboratory conditions to avoid impairments effects introduced by a noisy channel. In alternative embodiments, however, calibration may also be performed periodically or continuously during normal operation of the receiver 160 in the field.

The DSP 166 receives the digital signal vector 205 and performs various processing operations to generate the digital output signal 209 representing the originally transmitted data. In one embodiment, the DSP 166 includes an equalizer 230 to equalize the channels of the digital signal vector 205.

In the DSP 166, the equalizer 230 compensates for channel impairments present in the digital signal vector 205 including, for example, chromatic dispersion, polarization mode dispersion, nonlinear optic effects, and polarization scrambling. In one embodiment, the equalizer 230 comprises a four channel feedforward adaptive equalizer that implements the following equation:

$$\begin{bmatrix} q_{HI}(n) \\ q_{HQ}(n) \\ q_{VI}(n) \\ q_{VQ}(n) \end{bmatrix} = \sum_{k=1}^{L} \begin{bmatrix} c_{00}(k) & c_{01}(k) & c_{02}(k) & c_{03}(k) \\ c_{10}(k) & c_{11}(k) & c_{12}(k) & c_{13}(k) \\ c_{20}(k) & c_{21}(k) & c_{22}(k) & c_{23}(k) \\ c_{30}(k) & c_{31}(k) & c_{32}(k) & c_{33}(k) \end{bmatrix} \begin{bmatrix} r_{HI}(n-k) \\ r_{HQ}(n-k) \\ r_{VI}(n-k) \\ r_{VQ}(n-k) \end{bmatrix} \quad (1)$$

where $r_{HI}$, $r_{HQ}$, $r_{VI}$, and $r_{VQ}$ are the inputs to the equalizer 230 representing the horizontally polarized in-phase channel (HI), the horizontally polarized quadrature channel (HQ), the vertically polarized in-phase channel (VI), and the vertically polarized quadrature channel respectively (VQ). $q_{HI}$, $q_{HQ}$, $q_{VI}$, and $q_{VQ}$ are the outputs out of the equalizer 230. $c_{ab}$, (for a,b∈[0, 1, 2, 3]) are filters (e.g., finite impulse response (FIR) filters), each having L taps (e.g., 16 taps). Here, the term "filter" is used in the mathematical sense to describe each of the individual vectors $c_{ab}$ in equation (1). These vectors $c_{ab}$ do not necessarily operate to filter signals independently of each other, but may instead be applied collectively in the equalizer 230 to achieve an overall filtering effect between an input signal and an output signal as described in equation (1).

During normal operation, the adaptive equalizer 230 dynamically adapts the taps of each of the filters $c_{ab}$ based on the time-varying properties of the communication channel. The matrix C converges to values that compensate for the impairments and continuously changes as the impairment conditions change. For example, in one embodiment a least-mean-square (LMS) algorithm is used to adapt the taps of the filters $c_{ab}$ to produce the least mean squares of an error signal. The equalizer 230 may alternatively use a different adaptive algorithm. As a result of the adaptive nature of the equalizer 230, the filters $c_{ab}$ will adapt if the relative timing of an input channel changes with respect to the other channels. Thus, the equalizer coefficients can provide useful information about the operation of the transmitter 110, receiver 160 and channel 130, which can be used for skew calibration and channel diagnostics according to various techniques described below.

Other components of the DSP 166 are omitted for simplicity in the illustration. In various embodiments, the DSP 166 may furthermore include processing and filtering components such as, for example, a bulk chromatic dispersion compensation block, a polarization mode dispersion compensation block, a timing recovery block, etc.

In one embodiment, a separate processor 180 is coupled to the DSP 166 and AFE 168 includes a skew estimator 240 and a channel diagnostics block 270. For example, the processor 180 may be embodied on the same chip as the receiver 160 or in a physically separate device (e.g., on a host board). In one embodiment, the functions attributed to processor 180 described herein are carried out by executing program instructions stored to a computer-readable storage medium. Alternatively, the processor 180 can be implemented as an application specific integrated circuit or a field programmable gate array (FPGA)).

The skew estimator 240 is utilized during calibration of the receiver 160. For example, in one embodiment, the skew estimator 240 receives the equalizer coefficients from the equalizer 230 and generates the control signal 213 to program the skew compensation registers of the skew compensation block 220 during calibration. Further details regarding operation of the skew estimator are described below.

In another embodiment, the control signal 213 can be provided by a different external device. For example, in one embodiment, the equalizer coefficients are outputted external to the DSP 166 where they can be to manually determine calibration settings. The skew compensation values can then be programmed into the skew compensation block 220 via firmware, a field programmable gate array (FPGA), or erasable programmable read-only memory (EPROM) that controls the skew compensation block 220.

The channel diagnostics block 270 also receives the equalizer coefficients from the equalizer 230 and generates various types of channel information such as a differential group delay (DGD) estimate. In one embodiment, information from the Rx framer 163 is also used in performing the channel diagnostics computations. The channel diagnostics information is used to provide a channel diagnostics output 260 useful for calibration and reporting. Additionally, the DGD estimate could optionally be used by the skew estimator 240 to estimate H/V skew during the calibration phase.

Figure 2B:
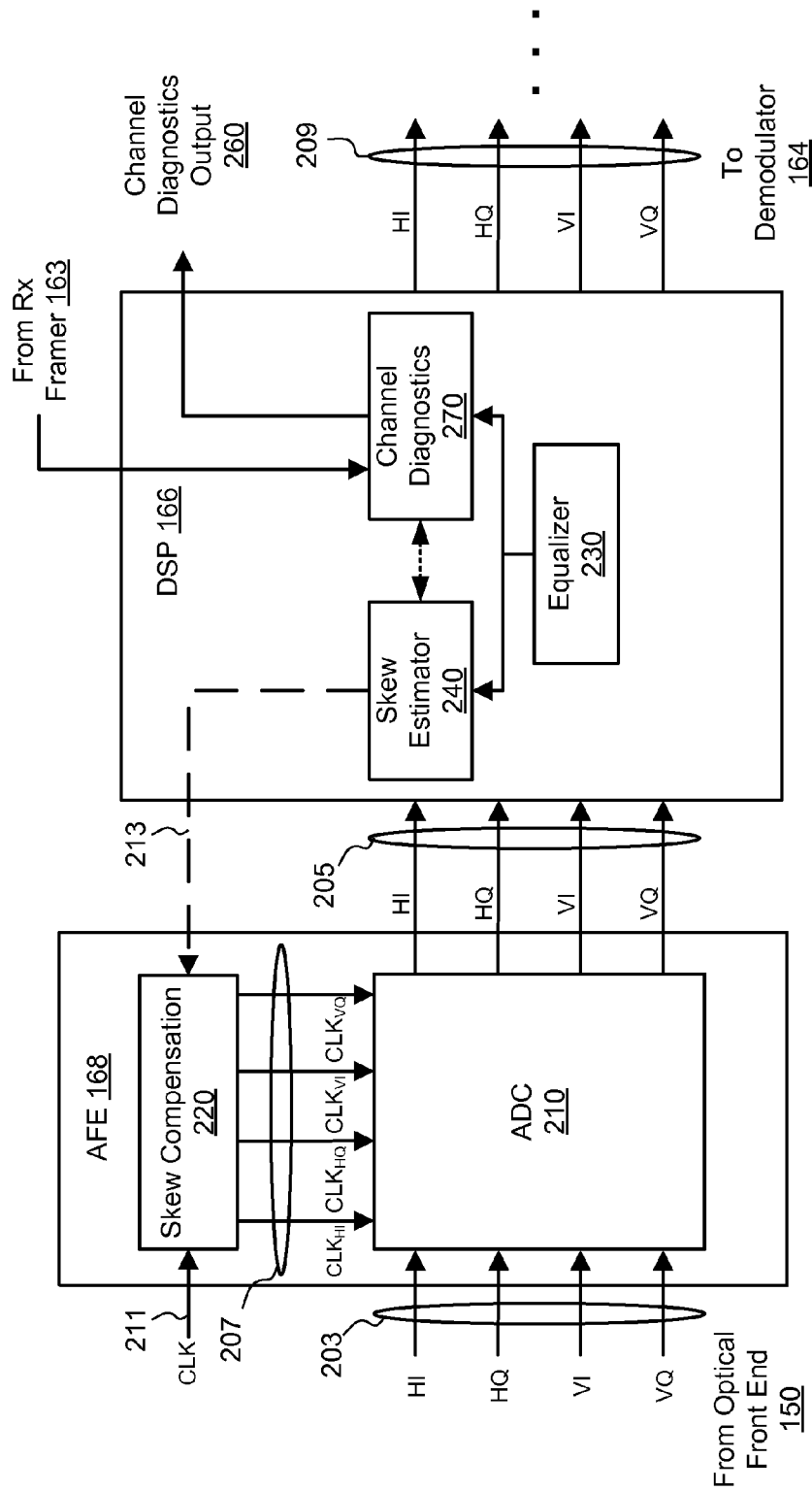
FIG. 2B is a block diagram illustrating a second embodiment of system for performing skew calibration.

FIG. 2B illustrates an alternative architecture in which the skew estimator 240 and channel diagnostics block 270 are instead embodied directly in the DSP 166 instead of in the separate processor 180.

Skew Compensation Based on Equalizer Coefficients

As described above, equalizer coefficients are used during calibration of the receiver 160 to estimate the skew between the channels and program the skew compensation block 220 to compensate for the estimated skew. It is generally desirable to perform calibration under ideal or near ideal operating conditions. Thus, in one embodiment, calibration is performed with the transmitter 110 and receiver 160 connected back-to-back (effectively bypassing the optical fiber). For example, in one embodiment, the back-to-back setup involves connecting the transmitter 110 to the receiver 160 using a channel 130 of negligible length. Furthermore, in one embodiment, certain features of the receiver 160 such as coarse carrier recovery may be bypassed during calibration. Additionally, it may be desirable to reduce the dynamic response of the equalizer 230 using available programmable options.

The calibration process is based on the adaptive operation of the equalizer 230 with respect to the incoming signal. Specifically, if the timing of $r_{HQ}$ changes with respect to the other inputs, the corresponding filters $c_{01}(k)$, $c_{11}(k)$, $c_{21}(k)$, $c_{31}(k)$ will adapt to reflect the change in timing. The inputs $r_{HI}$, $r_{HQ}$, $r_{VI}$, and $r_{VQ}$ are not independent, but rather will maintain certain relationships when the channels are properly aligned. Because the equalizer 230 adapts to the channel data, the equalizer filters will maintain the channel relationships when the signals are aligned. Particularly, when the channels are properly aligned, the filters will reflect the appropriate in-phase and quadrature relationships between the input signals. Additionally, when the channels are properly aligned, the filters will maintain time reversal symmetry between the horizontally polarized inputs and the vertically polarized inputs. In an equalizer 230 having the characteristics of equation (1), the filter coefficients will have the following relationships when the HI and HQ channels are aligned: $c_{11} \approx c_{00}$ and $-c_{01} \approx c_{10}$. Furthermore, when the VI and VQ channels are aligned, the following relationships will be maintained: $c_{33} \approx c_{22}$ and $-c_{23} \approx c_{32}$.

When the channels are misaligned (e.g., due to skew between HI and HQ or between VI and VQ), the filter coefficients will adapt in response and will reflect the misalignment. In order to determine the amount of skew in the HQ channel relative to the HI channel, $c_{11}$ is compared to $c_{00}$ and $-c_{01}$ is compared to $c_{10}$. Similarly, to determine the amount of skew in the VQ channel relative to the VI channel, $c_{33}$ is compared to $c_{22}$ and $-c_{23}$ is compared to $c_{32}$.

Figure 3:
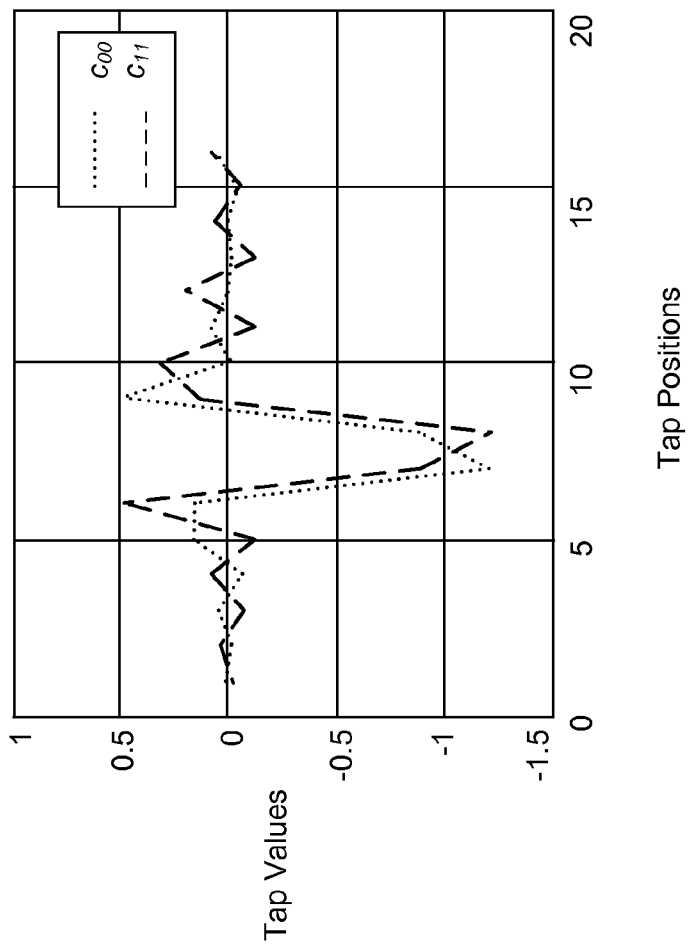
FIG. 3 is a graph illustrating an example of filter coefficients that indicate the presence of skew between an in-phase channel and a quadrature channel.

FIG. 3 is a plot illustrating an example of tap values for filters $c_{00}$ and $c_{11}$ which may be used to compare skew between the HQ and HI channels. As can be seen, the tap values are misaligned, indicating a relative skew between the HI and HQ channels. By observing the relative positions of the taps corresponding to the filters $c_{00}$ and $c_{11}$, the skew estimator 240 can estimate the skew between the HI and HQ channels. The detected skew can then be provided to the skew compensation block 220 (via control signal 213) to compensate for the skew. Skew between the VI and VQ channels can be similarly estimated and compensated. A number of different methods can be used to compute a skew metric based on the tap coefficients, examples of which will be described below.

Correlation Method

Figure 4A:
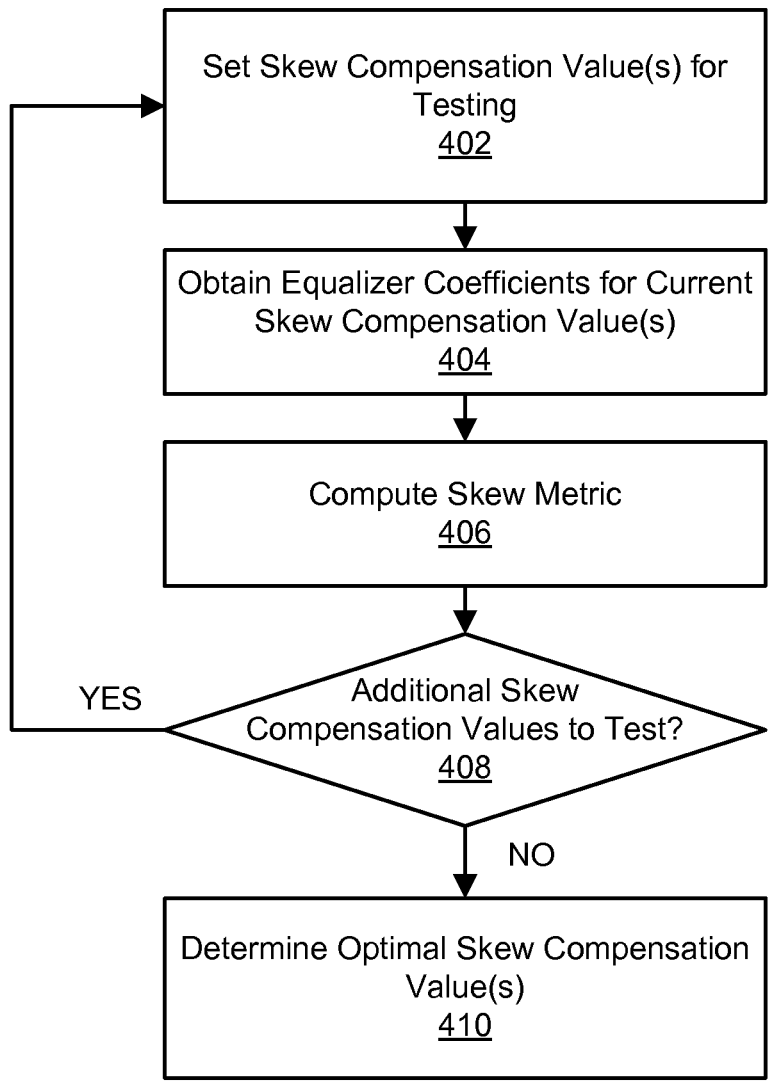
FIG. 4A is a flowchart illustrating a first embodiment of a skew calibration process using a correlation approach.

FIG. 4 is a flowchart illustrating an embodiment of a process for calibrating skew compensation values according to a correlation method. In the correlation method, skew compensation values are tested over a range of values and optimal skew compensation values are then determined based on the calculated metrics. In one embodiment of the process, the skew compensation block 220 first sets 402 its skew compensation registers to initial values for testing. For example, the skew compensation block 220 programs the skew compensation values to introduce an appropriate amount of phase shift to the sampling clocks 207 that will compensate for the skew represented by the skew parameters $\tau_I$, $\tau_Q$, where $\tau_I$ refers to the skew parameter for the in phase channel (HI or VI) and $\tau_Q$ refers to the skew parameter for the quadrature channel (HQ or VQ).

The skew estimator 240 obtains 404 the coefficients of the relevant equalizer filters from the equalizer 230 while operating the receiver 160 with the skew compensation block 220 set based on the current skew parameters. For example, in one embodiment, a test data pattern is transmitted to the receiver 160 until the equalizer 230 converges (i.e., the filter coefficients adapt until they reach substantially stable values). The relevant filter coefficients are then read from the equalizer 230. To determine the skew between HI and HQ channels, coefficients of filters $c_{11}$, $c_{00}$, $c_{01}$, and $c_{10}$ are obtained. To determine the amount of skew between VQ and VI channels, coefficients of filters $c_{33}$, $c_{22}$, $c_{23}$, and $c_{32}$ are obtained. The skew estimator 240 computes 406 a skew metric between the in-phase and quadrature channels based on the obtained filter coefficients. For example, in one embodiment the skew metric is determined based on a correlation between the relevant filters using the following equation:

$$R_{(ab,cd)}(\tau_I,\tau_Q) = \Sigma_{n=1}^{L} c_{ab}(n,\tau_I) \cdot c_{cd}(n,\tau_Q); a,b \in [0,1,2,3] \quad (2)$$

where $R_{(ab,cd)}(\tau_I,\tau_Q)$ represents a correlation metric between filters $c_{ab}$ and $c_{cd}$. For example, to determine skew between HI and HQ channels, $R_{(00,11)}(\tau_I, \tau_Q)$ and $R_{(01,10)}(\tau_I, \tau_Q)$ are computed, which represent the correlation between filters $c_{00}$ and $c_{11}$ and between filters $c_{01}$ and $c_{10}$ respectively. Then an overall correlation metric $R_{HIHQ}$ for the horizontally polarized channels can be determined by scaling each term by the energy of the corresponding filters:

$$R_{HIHQ}(\tau_I, \tau_Q) = \frac{2[R_{(00,11)}(\tau_I, \tau_Q) - R_{(10,01)}(\tau_I, \tau_Q)]}{R_{(00,00)}(\tau_I, \tau_I) + R_{(11,11)}(\tau_Q, \tau_Q) + R_{(10,10)}(\tau_I, \tau_I) + R_{(01,01)}(\tau_Q, \tau_Q)} \quad (3)$$

Similarly, to determine skew between VI and VQ channels, $R_{(33,22)}(\tau_I, \tau_Q)$ and $R_{(23,32)}(\tau_I, \tau_Q)$ are computed, which represent the correlation between filters $c_{33}$ and $c_{22}$ and between filters $c_{23}$ and $c_{32}$ respectively. Then an overall correlation metric $R_{VIVQ}$ for the vertically polarized channels can be determined as follows:

$$R_{VIVQ}(\tau_I, \tau_Q) = \frac{2[R_{(33,22)}(\tau_I, \tau_Q) - R_{(32,23)}(\tau_I, \tau_Q)]}{R_{(33,33)}(\tau_I, \tau_I) + R_{(22,22)}(\tau_Q, \tau_Q) + R_{(32,32)}(\tau_I, \tau_I) + R_{(23,23)}(\tau_Q, \tau_Q)} \quad (4)$$

In step 408, the skew estimator 240 determines whether there are additional skew compensation value to test. If there are additional skew compensation values to test, the skew compensation block 220 is programmed with new values and the process repeats from step 402. Once the full range of skew compensation values are tested, the optimal skew values are determined 410 based on the skew metrics (e.g., the metric indicating the highest correlation). The skew compensation block 220 is then configured with these optimal values for use during operation of the receiver 160. For example, in one embodiment, skew compensation registers associated with phase interpolators are configured to apply an appropriate amount of phase shift to the sampling clocks associated with each channel based on the determined skew.

Various strategies may be employed in selecting the range of skew compensation values for testing. For example, in one embodiment, the skew compensation registers for the in phase channel is set to the middle of its range (e.g., $\tau_I$=0) and the skew compensation register for the quadrature channel is swept across a predefined testing range (e.g., ±2 unit intervals). Alternatively, the skew compensation register for the quadrature channel is fixed and the skew parameter for the in phase channel is swept across its range. In other embodiments, parametric sweeps may be performed to test different combinations of values for $\tau_I$, $\tau_Q$.

Center of Gravity Method

Figure 4B:
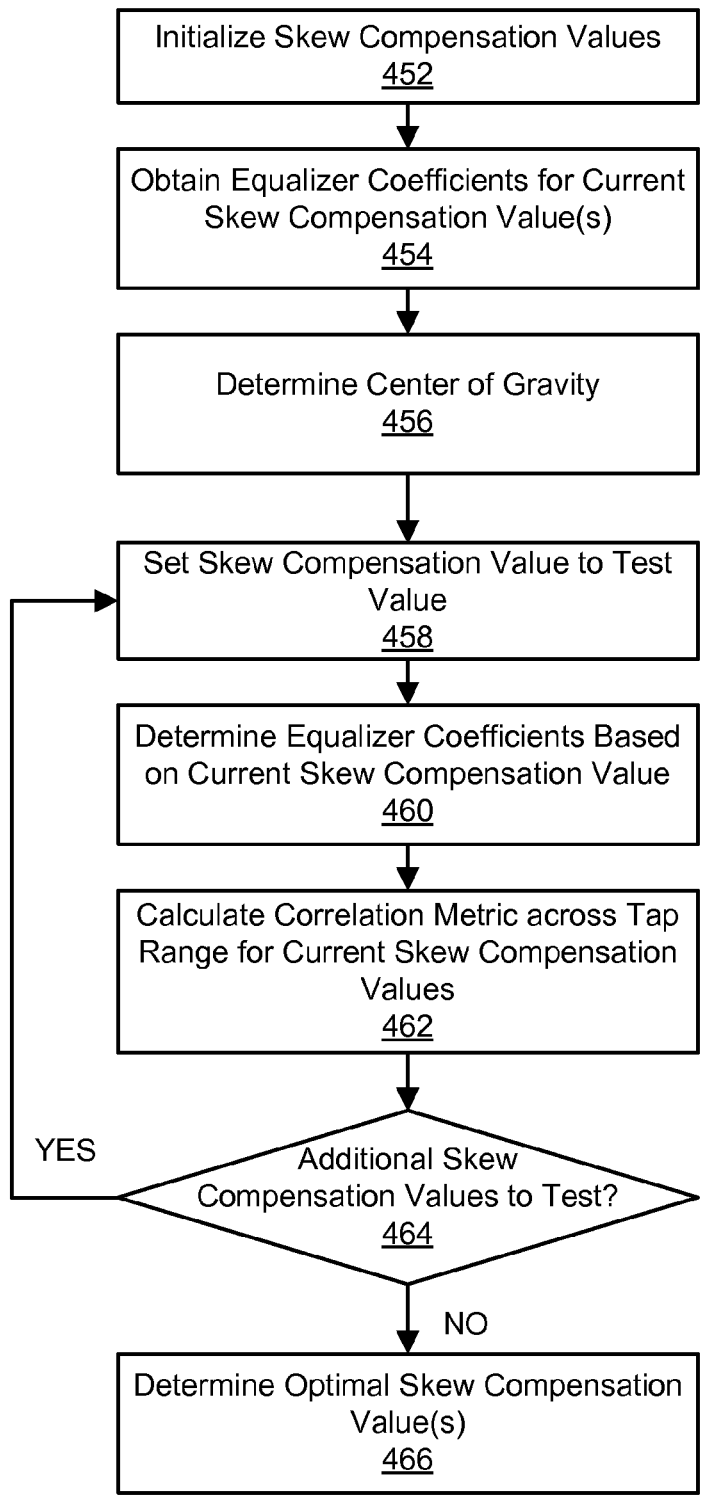
FIG. 4B is a flowchart illustrating a second embodiment of a skew calibration process using a center of gravity and correlation approach.

In another embodiment, a "center of gravity" method is used to determine the relative skew between the channels based on the equalizer coefficients. FIG. 4B is a flowchart illustrating an embodiment of a process for calibrating skew parameters according to the center of gravity method. Skew compensation values are first initialized 452 to initial values configured to compensate for skews $\tau_1$, $\tau_Q$. For example, in one embodiment, skew compensation values are initialized to the middle of the range to presume no skew in the signals (e.g., $\tau_1$, $\tau_Q$=0). Once the equalizer 230 converges, the coefficients of the equalizer filters are then obtained 454 using the current skew compensation values. A center of gravity is then determined 456 based on the captured equalizer coefficients. The center of gravity represents the average tap number in which the highest amount of coefficient energy is concentrated (e.g., where the major peaks of the equalizer coefficients are located). The center of gravity therefore provides a good indication of the average tap position in which the equalizer coefficients are centered. A variety of different metrics may be used to compute the center of gravity. For example, in one embodiment, the centers of gravity for the horizontally polarized channels and the vertically polarized channels are computed as follows:

$$CGH = \frac{\sum_{n=1}^{L}(n)(|c_{00}(n)| + |c_{10}(n)|)}{\sum_{n=1}^{L}(|c_{00}(n)| + |c_{10}(n)|)} \quad (9a)$$

$$CGV = \frac{\sum_{n=1}^{L}(n)(|c_{22}(n)| + |c_{32}(n)|)}{\sum_{n=1}^{L}(|c_{22}(n)| + |c_{32}(n)|)}$$

where CGH is the center of gravity of the horizontally polarized channels and CGV is the center of gravity for the vertically polarized channels. In another embodiment, additional coefficients may be considered in the center of gravity equations. For example, in another embodiment, the centers of gravity may be determined as follows:

$$CGH = \frac{\sum_{n=1}^{L}(n)(|c_{00}(n)| + |c_{10}(n)| + |c_{11}(n)| + |c_{01}(n)|)}{\sum_{n=1}^{L}(|c_{00}(n)| + |c_{10}(n)| + |c_{11}(n)| + |c_{01}(n)|)} \quad (9b)$$

$$CGV = \frac{\sum_{n=1}^{L}(n)(|c_{22}(n)| + |c_{32}(n)| + |c_{33}(n)| + |c_{23}(n)|)}{\sum_{n=1}^{L}(|c_{22}(n)| + |c_{32}(n)| + |c_{33}(n)| + |c_{23}(n)|)}$$

In yet another alternative embodiment, the centers of gravity may be determined as follows:

$$CGH = \frac{\sum_{n=1}^{L}(n)((c_{00}(n) + c_{11}(n))^2 + (c_{01}(n) - c_{10}(n))^2 + (c_{02}(n) + c_{13}(n))^2 + (c_{03}(n) - c_{12}(n))^2)}{\sum_{n=1}^{L}((c_{00}(n) + c_{11}(n))^2 + (c_{01}(n) - c_{10}(n))^2 + (c_{02}(n) + c_{13}(n))^2 + (c_{03}(n) - c_{12}(n))^2)} \quad (9c)$$

$$CGV = \frac{\sum_{n=1}^{L}(n)((c_{20}(n) + c_{31}(n))^2 + (c_{21}(n) - c_{30}(n))^2 + (c_{22}(n) + c_{33}(n))^2 + (c_{23}(n) - c_{32}(n))^2)}{\sum_{n=1}^{L}((c_{20}(n) + c_{31}(n))^2 + (c_{21}(n) - c_{30}(n))^2 + (c_{22}(n) + c_{33}(n))^2 + (c_{23}(n) - c_{32}(n))^2)}$$

In yet another alternative embodiment, the centers of gravity may be determined as follows:

$$CGH = \frac{\sum_{n=1}^{L}(n)((c_{00}(n) + c_{11}(n))^2 + (c_{01}(n) - c_{10}(n))^2 + (c_{20}(n) + c_{31}(n))^2 + (c_{21}(n) - c_{30}(n))^2)}{\sum_{n=1}^{L}((c_{00}(n) + c_{11}(n))^2 + (c_{01}(n) - c_{10}(n))^2 + (c_{20}(n) + c_{31}(n))^2 + (c_{21}(n) - c_{30}(n))^2)} \quad (9d)$$

-continued $$CGV = \frac{\sum_{n=1}^{L}(n)((c_{22}(n)+c_{33}(n))^2+(c_{23}(n)-c_{32}(n))^2+(c_{02}(n)+c_{13}(n))^2+(c_{03}(n)-c_{12}(n))^2)}{\sum_{n=1}^{L}((c_{22}(n)+c_{33}(n))^2+(c_{23}(n)-c_{32}(n))^2+(c_{02}(n)+c_{13}(n))^2+(c_{03}(n)-c_{12}(n))^2)}$$

A sweep of the skew compensation values then begins. For example, in one embodiment, the skew compensation values for the in-phase channels (HI and VI) are swept across a predefined testing range while the quadrature channels (HQ and VQ) remain constant at their centered value. Alternatively, the skew compensation values for the quadrature channels may be swept while the in-phase channels are held constant. To begin the sweep, the skew compensation value for the channel under calibration is set 458 to a first test value in a predefined testing range. The equalizer coefficients are then determined 460 once the equalizer 230 converges with the current skew compensation values. Error values for the current skew parameter are then calculated 512 as follows:

$$\Delta H_\tau = \sum_{n=round(CGH-x)}^{round(CGH+x)} |HI_n - HQ_n| \quad (10)$$

$$\Delta V_\tau = \sum_{n=round(CGV-x)}^{round(CGV+x)} |VI_n - VQ_n|$$

where x represents a tap range parameter (e.g., x=3) that defines a range around the tap closest to the center of gravity to be used in the error calculation, round ( ) is a function that returns the nearest integer of the argument, and where:

$$HI_n = c_{00}(n) - c_{10}(n)$$

$$HQ_n = c_{11}(n) + c_{01}(n)$$

$$VI_n = c_{22}(n) - c_{32}(n)$$

$$VQ_n = c_{33}(n) + c_{23}(n) \quad (11)$$

If in step 464, there are additional skew compensation values to test in the defined testing range, the next skew compensation value is applied and the process loops back to step 468.

Otherwise, once correlation metrics are determined for all skew compensation values in the desired testing range, the minimum error values $\Delta H_{min}$ and $\Delta V_{min}$ are determined 466 from all of the tested skew compensation values. The skew compensation values associated with the minimum error values are written to the skew compensation registers of the skew compensation block 220.

Group Delay Method

In another embodiment, the skew metric is determined by computing a difference in group delay between the relevant filters being compared. Let the discrete Fourier transform (DFT) of a filter be $H(w) = A(\omega)e^{-i\Theta(\omega)}$. Where $A(\omega)$ is the magnitude of the frequency response and $\Theta(\omega)$ is the phase. Then the group delay is defined as:

$$\tau(\omega) = -\frac{d\theta(\omega)}{d\omega} \quad (12)$$

For H polarization IQ skew, the group delay is computed as follows:

$$DFT[c_{00}(n)] = A_{00}(\omega)\exp(-i\theta_{00}(\omega)), \quad (13a)$$

$$DFT[c_{11}(n)] = A_{11}(\omega)\exp(-i\theta_{11}(\omega));$$

$$DFT[c_{01}(n)] = A_{01}(\omega)\exp(-i\theta_{01}(\omega)),$$

$$DFT[c_{10}(n)] = A_{10}(\omega)\exp(-i\theta_{10}(\omega));$$

$$\tau_{(00,11)} = \left(\frac{d\theta_{11}(\omega)}{d\omega} - \frac{d\theta_{00}(\omega)}{d\omega}\right)\bigg|_{\omega=0};$$

$$\tau_{(10,01)} = \left(\frac{d\theta_{10}(\omega)}{d\omega} - \frac{d\theta_{01}(\omega)}{d\omega}\right)\bigg|_{\omega=0}$$

The group delays can be combined by to compute an overall skew value by scaling the group delays by the magnitude response at DC. In other words, $$\tau_{HIHQ} = ([A_{00}^2(0)+A_{11}^2(0)]\tau_{(00,11)}+[A_{10}^2(0)+A_{01}^2(0)]\tau_{(10,01)})/[A_{00}^2(0)+A_{11}^2(0)+A_{10}^2(0)+A_{01}^2(0)] \quad (13b)$$

For V polarization IQ skew, the group delay is computed as follows:

$$DFT[c_{00}(n)] = A_{22}(\omega)\exp(-i\theta_{22}(\omega)), \quad (14a)$$

$$DFT[c_{33}(n)] = A_{22}(\omega)\exp(-i\theta_{22}(\omega));$$

$$DFT[c_{01}(n)] = A_{23}(\omega)\exp(-i\theta_{23}(\omega)),$$

$$DFT[c_{32}(n)] = A_{32}(\omega)\exp(-i\theta_{32}(\omega));$$

$$\tau_{(22,33)} = \left(\frac{d\theta_{22}(\omega)}{d\omega} - \frac{d\theta_{33}(\omega)}{d\omega}\right)\bigg|_{\omega=0};$$

$$\tau_{(22,23)} = \left(\frac{d\theta_{32}(\omega)}{d\omega} - \frac{d\theta_{23}(\omega)}{d\omega}\right)\bigg|_{\omega=0}$$

The group delays can be combined to compute an overall skew value by scaling the group delays by the magnitude response at DC. In other words, $$\tau_{VIVQ} = ([A_{22}^2(0)+A_{33}^2(0)]\tau_{(22,33)}+[A_{32}^2(0)+A_{23}^2(0)]\tau_{(32,23)})/[A_{22}^2(0)+A_{33}^2(0)+A_{32}^2(0)+A_{23}^2(0)] \quad (14b)$$

The skew compensation block 220 can then be set to compensate for the overall skew determined in Eqs. (13b) and (14b) above.

HV Skew Calibration

Figure 5:
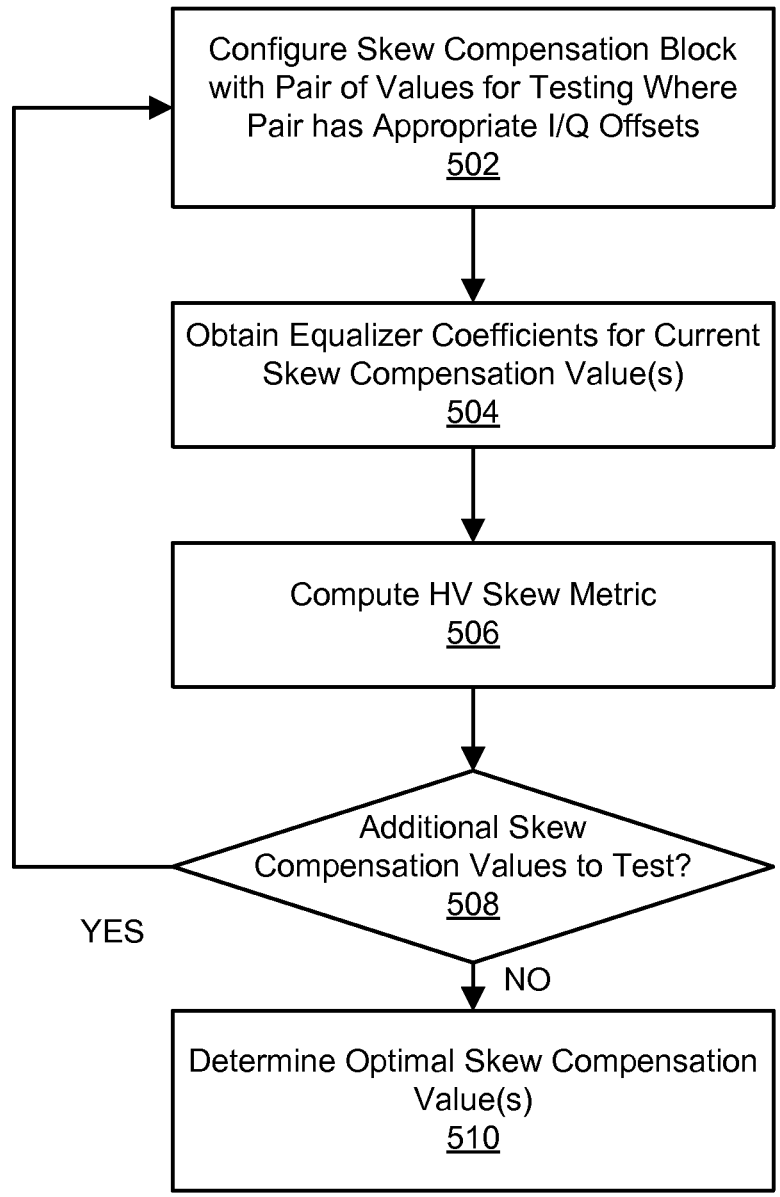
FIG. 5 is a flowchart illustrating an embodiment of a skew calibration process for compensating for skew between horizontal and vertical polarizations.

In another embodiment, a calibration process detects skew between the horizontally polarized channels and the vertically polarized channels (referred to herein as "HV skew") and programs the skew compensation block 220 to compensate for the detected skew. To extract the HV skew information from the equalizer coefficients, IQ and time reversal symmetry relationships are applied. This relationship is embodied in the calculation of differential group delay (DGD) between the horizontally and vertically polarized channels. FIG. 5 illustrates an example embodiment for calibrating a receiver 160 to compensate for skew between the horizontal and vertical polarizations. For example, in one embodiment, once the skew compensation block 220 is configured with the appropriate offset I/Q offsets according to any of the techniques discussed above, the skew compensation values for the horizontal or vertical channels are then set 502 to a pair of compensation values that maintain the determined IQ offset. The equalizer coefficients are obtained 504 and the HV skew metric is computed 506 based on the DGD. Here, the DGD may be estimated according to the group delay method described above, or the DGD information may be obtained from the channel diagnostics block 270 (as indicated by the dashed arrow from the channel diagnostics block 270 to the skew estimator 240) using any of the techniques described below. If there are additional pairs of skew compensation values to test in step 508, the process loops back to step 502 and repeats for the next pair of values. Otherwise, the optimal values are selected 510 according to the same techniques described above (e.g., to minimize DGD).

The above described process may be used to generate skew metrics while varying the HI and HQ channels together across a testing range while maintaining the determined offset between HI and HQ. Alternatively, the above described process may be used to generate skew metrics while varying the VI and VQ channels together across a testing range while maintaining the determined offset between VI and VQ.

Channel Diagnostics Using Equalizer Coefficients

In one embodiment, the receiver 160 can also use the equalizer coefficients to perform channel diagnostics. In contrast to the calibration procedure discussed above, channel diagnostics is typically performed dynamically during real-time operation of the receiver 160 under field conditions in order to obtain real-time diagnostic information. Channel diagnostics estimate various time-varying characteristics of the incoming data signal, including, for example, the differential group delay (DGD) in the optical channel 130. In one embodiment, the obtained information can then be used to compensate for impairments introduced in the data channel. Additionally, the channel diagnostics information may be externally reported where it may be logged or analyzed to extract various types of performance information. The channel diagnostics process will produce the most accurate results when the receiver 160 is correctly calibrated to compensate for I/Q skew, which can be accomplished using any of the techniques mentioned above.

As with the skew compensation process described above, channel diagnostics information can be obtained based on the adaptive operation of the equalizer 230 with respect to the incoming signal. Eq. (1) can be rewritten as filtering electrical fields of the input signals to the equalizer 230 as follows:

$$\begin{bmatrix} q_{HI}(n) + iq_{HQ}(n) \\ q_{VI}(n) + iq_{VQ}(n) \end{bmatrix} = \begin{bmatrix} h_{HHI}(n) + ih_{HHQ}(n) & h_{HVI}(n) + ih_{HVQ}(n) \\ h_{VHI}(n) + ih_{VHQ}(n) & h_{VVI}(n) + ih_{VVQ}(n) \end{bmatrix} * \begin{bmatrix} r_{HI}(n) + ir_{HQ}(n) \\ r_{VI}(n) + ir_{VQ}(n) \end{bmatrix} \quad (15)$$

where:

$h_{HHI} = 0.5*(c_{00}+c_{11})$;

$h_{HHQ} = 0.5*(c_{10}-c_{02})$;

$h_{HVI} = 0.5*(c_{02}+c_{13})$;

$h_{HVQ} = 0.5*(c_{12}-c_{03})$;

$h_{VHI} = 0.5*(c_{20}+c_{31})$;

$h_{VHQ} = 0.5*(c_{30}-c_{21})$;

$h_{VVI} = 0.5*(c_{22}+c_{33})$; and $h_{VVQ} = 0.5*(c_{32}-c_{23})$. \quad (16)

If Eqn. (15) is represented in the frequency domain, the operation will be matrix multiplication expressed as:

$Q(\omega) = H(\omega)R(\omega)$. \quad (17)

where $\omega$ is the angular frequency. If $H(\omega)$ is assumed to be a perfect inverse of the linear optical channel distortions, it is then possible to derive the channel parameters from $H(\omega)$:

$$H(\omega) = D(\omega) \prod_{n=1}^{N} U_n(\omega) E_n. \quad (18)$$

where $D(\omega)$ represents the frequency response of chromatic dispersion, and $U_n(\omega)$ and $E_n$ are matrices representing local birefringence and polarization dependent Loss (PD), respectively.

The chromatic dispersion (CD) portion of the channel distortions can be isolated from $H(\omega)$ by taking the determinant of $H(\omega)$:

$$\det(H(\omega)) = D^2(\omega) \prod_{n=1}^{N} \det(U_n(\omega))\det(E_n), \quad (19)$$

$$= D^2(\omega) \prod_{n=1}^{N} k_n$$

Therefore, the amount of CD can be determined by quadratic fitting of the unwrapped phase of $\det(H(\omega))^{1/2}$.

To isolate the effect of differential group delay (DGD), $H(\omega)$ is normalized by its determinant. The normalization will remove the effect of CD and minimize the effect of polarization-dependent loss (PDL):

$T(\omega) = H(\omega)/det(H(\omega))$. \quad (20)

Where $T(\omega)$ represents the normalized frequency response of an ideal equalizer. The DGD can be derived from $T(\omega)$ using a frequency based method. In general, it is reasonable to assume that $T(\omega)$ for $|\omega-\omega_0|<B/(4\pi)$ can be approximated by:

$$T(\omega) = V^{-1}(\omega_o) \begin{bmatrix} \exp(i\omega\tau_n/2) & 0 \\ 0 & \exp(-i\omega\tau_n/2) \end{bmatrix} U(\omega_o) \quad (21)$$

where B is the symbol rate, $\omega_0$ is the offset between the signal and a local oscillator, and V and U are unitary transformation matrices. From Eqn. (19), DGD can be determined using the following equation:

$\tau(\omega_0) = \sqrt{det(dT(\omega)/d\omega)}|_{\omega_0}$ \quad (22)

The DGD varies with frequency. An accurate estimate of the DGD can be determined, in one embodiment, by averaging DGD over frequency. In one embodiment, DGD can be estimated by based on the fractional group delay of the frequency responses of each equalizer filter.

The equalizer can be seen as an approximation to an ideal fractional delay filter $h_\mu(n)=\sin(\pi(n-\mu))/(\pi(n-\mu))$ over the symbol rate. The DGD varies with frequency due to truncation of these ideal fractional delay filters. The approximation is the result of windowing the filter response. Its effect can be approximated by the convolution of the frequency response of the window function:

$$H_w(\omega)=\sin(\omega(N/2))/(N\sin(\omega/2)) \quad (23)$$

where N is number of taps.

The main lobe of the window function is 2/N. Given that the group delay and magnitude of frequency response of the ideal fractional delay filter are both constant in frequency, the variation is expected to have periods of 2/N. If group delay is averaged over the symbol rate, N/4 cycles of variations are expected. Assuming that the number of taps is a multiple of 4, the overall group delay can be accurately estimated by averaging the group delay over a range of frequencies:

$$\bar{\tau} = \frac{1}{2\pi T_S B} \int_{\omega_o-2\pi T_S B/2}^{\omega_o+\pi T_S B/2} \tau(\omega)\,d\omega \quad (24)$$

where B is the symbol rate, $T_s$ is the sampling rate, and $\bar{\tau}$ is the average group delay. $\bar{\tau}$ is used by the channel diagnostics block 270 as the DGD estimation. The channel diagnostics information can be outputted externally to the receiver 160 (e.g., via a channel diagnostics output 260) to be used in various reporting and calibration procedures.

Figure 6:
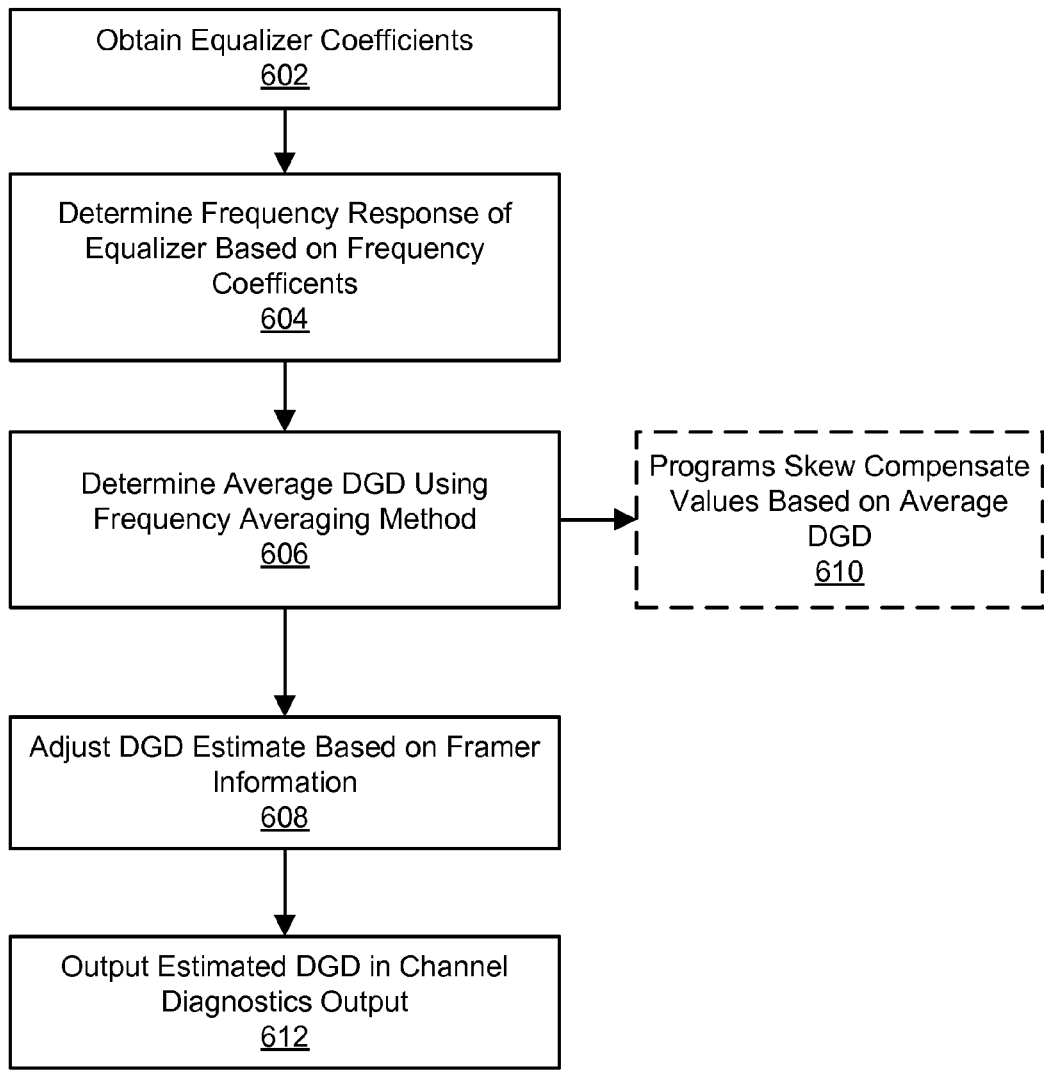
FIG. 6 is a flowchart illustrating an embodiment of a process for detecting differential group delay based on frequency coefficients and framer information.

FIG. 6 illustrates an example embodiment of a process for detecting DGD using the principles described. The channel diagnostics block 270 obtains 602 equalizer coefficients representing the current state of the adaptive equalizer. The channel diagnostics block 270 then determines 604 a frequency response of the adaptive equalizer based on the equalizer coefficients. The channel diagnostics block 270 then determines 606 the average DGD based on the frequency response using the frequency averaging technique in Eq. (24) described above in which DGD is averaged over a range of operating frequencies.

In some implementations, the equalizer 230 itself may naturally add DGD in the receiver 160 based on the operating characteristics of the equalizer 230. This DGD is added after the data has been decoded by the receiver 160, so it does not directly affect performance and need not be compensated for by the skew compensation block 220. Nevertheless, it is desirable for the channel diagnostics information to accurately report the DGD added by the channel 130 and transmitter 110. Because this particular DGD is instead added by the receiver 160, it is desirable to mathematically remove this component from the DGD estimation included in the channel diagnostics output 260.

The DGD introduced by the equalizer 230 may include DGD that is an integer number of symbol periods. Blind adaptation of the equalizer 230 generally cannot resolve DGD that is an integer number of symbol period. Instead, information embedded in the Rx framer 163 can be used to detect this DGD. The DGD estimate can then be adjusted 608 based on the framer information. For example, in one embodiment, the Rx framer 163 monitors the H and V lane skew at the Rx framer 163 and provides this information to the channel diagnostics block 270. In one embodiment, this information can be obtained by reading a specific framer register after the DSP has converged.

The frequency response of the equalizer 230 can be represented as follows:

$$G = \begin{bmatrix} \exp\left(\frac{i\omega T}{2}\right) & 0 \\ 0 & \exp\left(-\frac{i\omega T}{2}\right) \end{bmatrix} H(\omega) \quad (25)$$

where G is the frequency response of the equalizer, T is the equalizer induced skew that is an integer multiple of a symbol period determined by the Rx framer 163, and H is an inverse of the linear optical channel distortions. If the raw equalizer frequency response is normalized by its determinant, as described above, it is a reasonable to estimate the skews as being evenly distributed between H and V channels.

The channel diagnostics block 270 then applies an inverse matrix Ito G to adjust the DGD estimate, where:

$$I = \begin{bmatrix} \exp\left(-\frac{i\omega T}{2}\right) & 0 \\ 0 & \exp\left(\frac{i\omega T}{2}\right) \end{bmatrix} \quad (26)$$

The estimated DGD, as adjusted, is then outputted 612 in the channel diagnostics output 260.

Steps 602, 604, 606, 608 of FIG. 6 are generally performed periodically while the receiver 160 operates in order to provide real-time channel information. However, these steps may also be performed as part of the calibration procedure described above with the transmitter 110 and receiver 160 configured in the back-to-back configuration to remove channel impairments. Here, an optional step 610 is included, in which the channel diagnostics block 270 programs 608 the skew compensation values of the skew compensation block 220 to compensate for the detected DGD (e.g., by adjusting the phases of the sampling clocks of the horizontally polarized channels relative to the vertically polarized channels or vice versa).

In another embodiment, the channel diagnostics block 270 can use the equalizer coefficients to detect performance degradation resulting in high bit error rate and synchronization loss, and reset the DSP 166 in response. The DSP 166 applies various iterative algorithms that should converge on a solution during start up conditions. However, under certain channel conditions, these algorithms may not properly converge to best solution, thus resulting in high bit error rate and synchronization loss. By resetting the DSP 166 when such conditions are detected, the algorithms can start over under different channel conditions, and may thus converge to a new solution that provides improved performance.

Figure 7A:
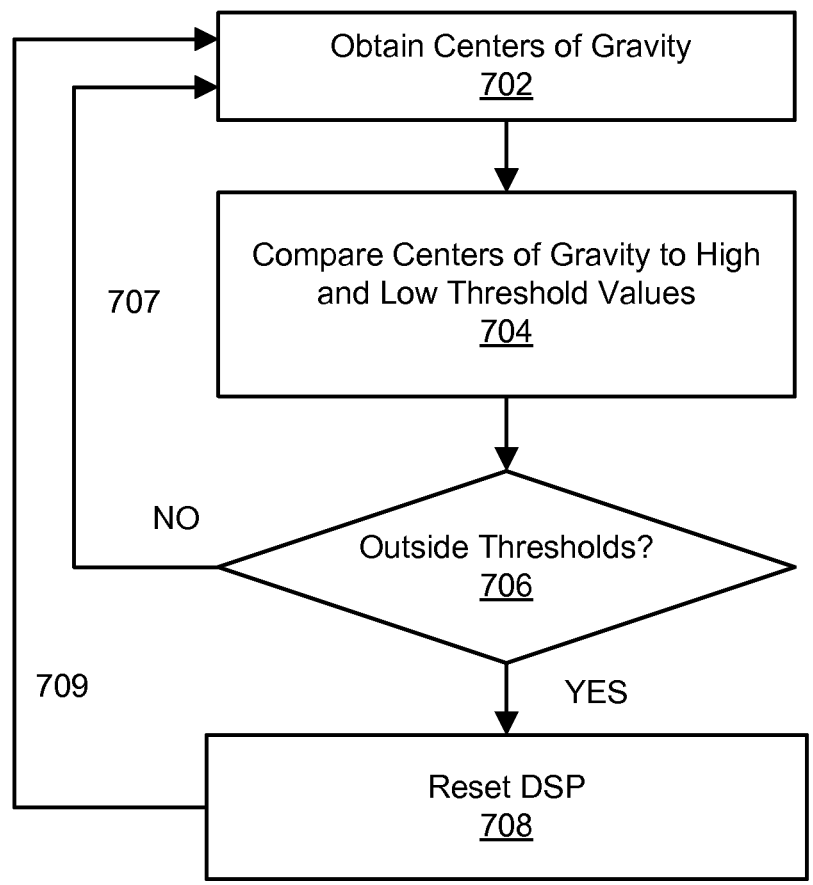
FIG. 7A is a flowchart illustrating a first embodiment of a process for resetting a digital signal processor when substantial performance degradation is detected.

FIG. 7A illustrates an embodiment of a process for handling performance degradation using channel information. The channel diagnostics block 270 obtains 702 centers of gravity based on the equalizer coefficients as described in equations (9a)-(9d) above. Here, the centers of gravity calculations may be performed in the channel diagnostics block 270, or may be obtained from the skew estimator 240. To achieve robust performance, the values of CGH and CGV should typically be within a target range centered at or near the midpoint of the taps (e.g., around 8.5 for a 16 tap filter $c_{ab}(1) \ldots c_{ab}(16)$. Thus, in one embodiment, the center of gravity is compared 704 to high and low threshold values which define a range around the midpoint. In different embodiments, this decision may be based on CGH only (independent of CGV), CGV only (independent of CGH), either CGH or CGV falling outside the range, or both CGH and CGV falling outside the range. In other embodiments, different weighting coefficients can be applied to the individual coefficients in the CGH and CGV definitions in equations (9a)-(9d) above for the purpose of this determination. If, the centers of gravity are not outside the thresholds (i.e., they are within the predetermined range), then the DSP 166 continues to operate normally and the process repeats 707. If, in step 706, the center of gravity falls outside the range, the receiver 160 resets 708 the DSP 166. The process then repeats 709 such that the centers of gravity are continuously monitored during operation.

Figure 7B:
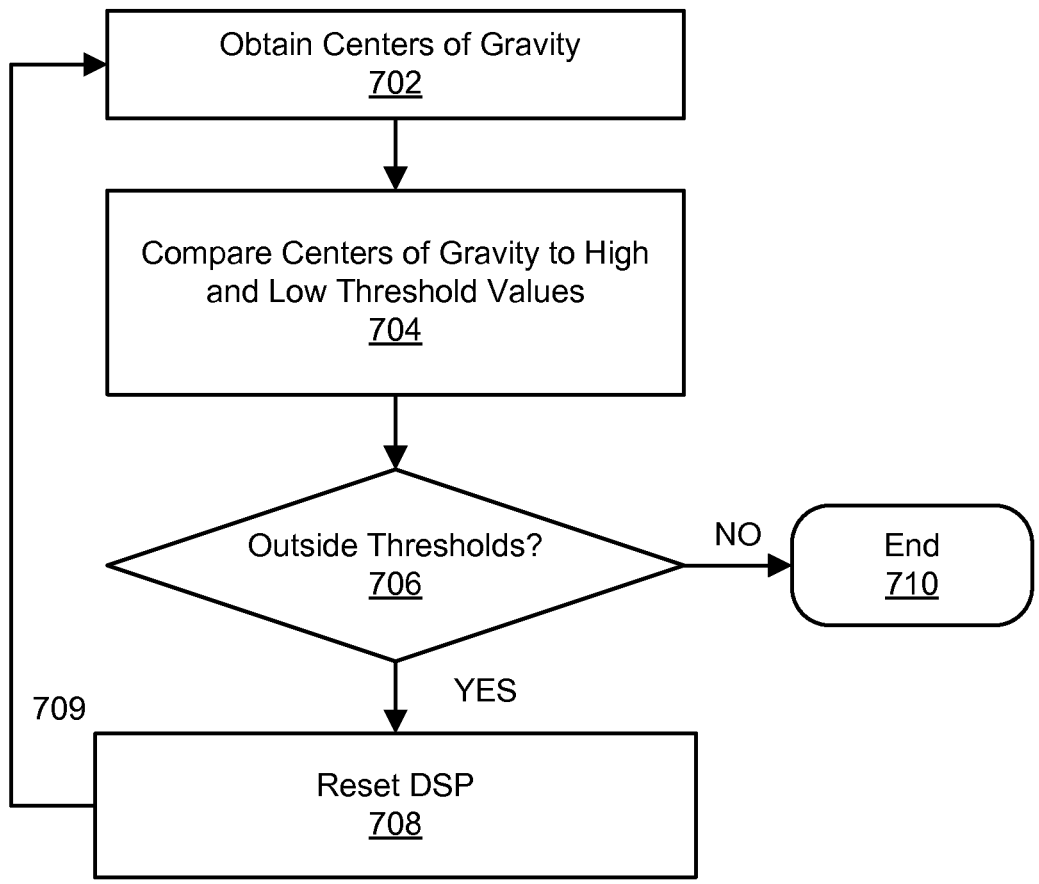
FIG. 7B is a flowchart illustrating a second embodiment of a process for resetting a digital signal processor when substantial performance degradation is detected.

FIG. 7B illustrates an alternative embodiment of a process for handling performance degradation using channel information. The process is similar to FIG. 7A described above, except that the process does not repeat 707 once centers of gravity within the predefined range are detected in step 706. Instead, if the centers of gravity are not outside the thresholds, the process ends 710 and the centers of gravity are no longer monitored.

Polarization Scrambling

Figure 8:
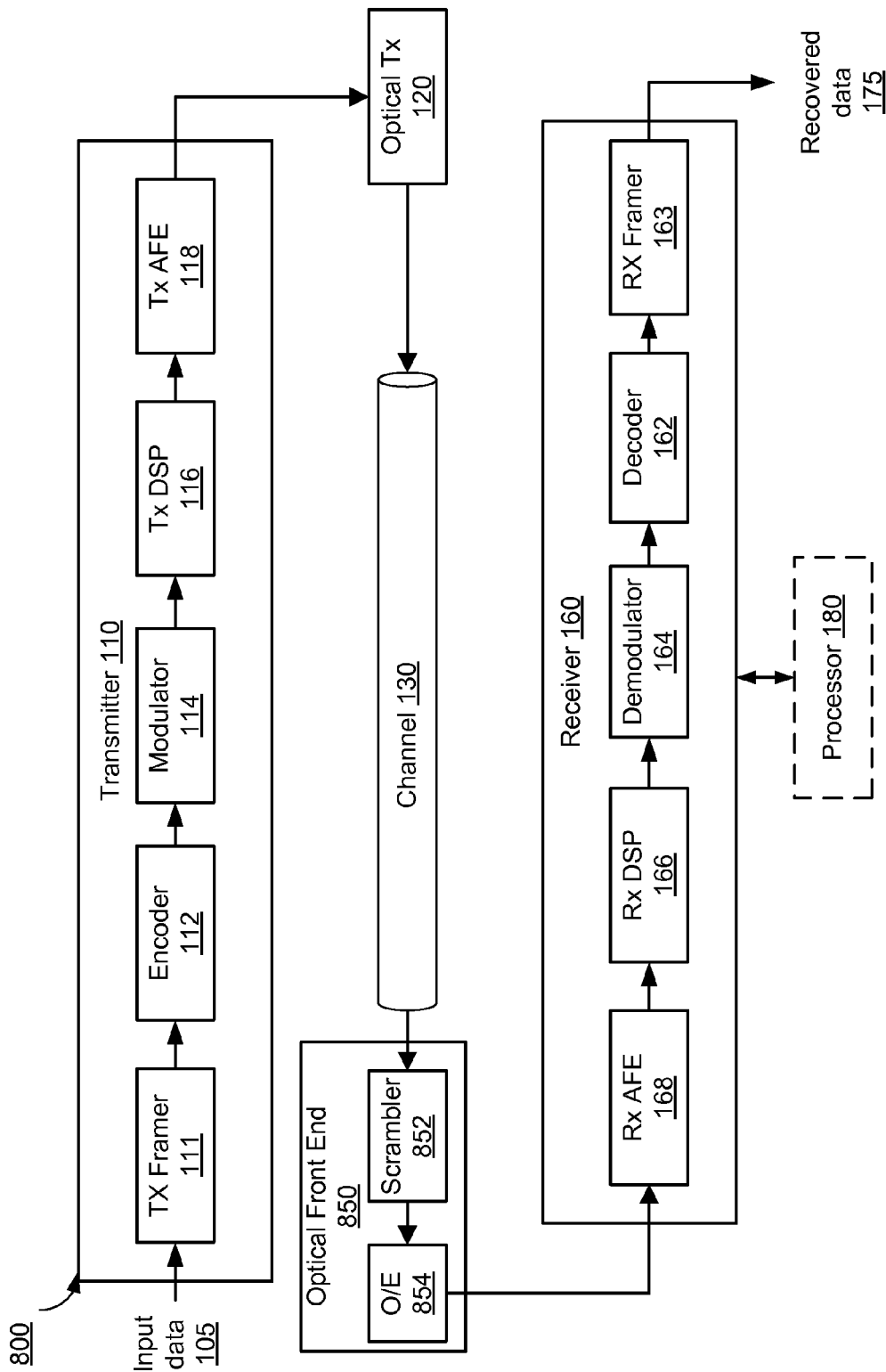
FIG. 8 is a block diagram illustrating an embodiment of an optical communication system having a polarization scrambler.

In an alternative embodiment, an accurate estimate of DGD can instead be determined by computing an average DGD over a range of polarization states instead of averaging over a range of frequencies. FIG. 8 illustrates an alternative embodiment of an optical communication system 800 in which the optical front end 850 comprises a polarization scrambler 852, which receives the optical signal from the channel 130. The polarization scrambler 852 continuously changes the state of polarization of the optical signal over the Poincaré sphere, and passes the optical signal to the optical-to-electrical (O/E) converter 854. In one embodiment, the polarization scrambler 852 is configured to vary the polarization states such that the entire Poincaré sphere will be covered within a predetermined time period, thus representing all possible polarizations states. The O/E converter 854 converts the optical signal to an electrical signal, and passes the electrical signal to the receiver 160. Group delays $\tau_t$ are calculated at a single frequency $\omega_0$ for a range of time points t (which corresponds to different polarization orientations since the polarization scrambler 862 varies the polarization states over time). These group delays are then averaged over polarization orientations to calculate a mean group delay $\bar{\tau}$, which can be used as a DGD estimate for any of the applications discussed above.

In another embodiment, polarization scrambling takes place in the DSP 166 instead of in the optical front end 850. In this embodiment, a matrix rotator in the DSP 166 applies a matrix rotation R to the input vector:

$$R(\theta, \phi) \begin{bmatrix} r_{HI}(n) + ir_{HQ}(n) \\ R_{VI}(n) + ir_{VQ}(n) \end{bmatrix} \quad (27)$$

where and $R(\theta, \phi)$ is the rotation matrix given by $$R(\theta, \phi) = \begin{bmatrix} e^{j\frac{\phi}{2}} & 0 \\ 0 & e^{-j\frac{\phi}{2}} \end{bmatrix} \begin{bmatrix} \cos(\theta) & \sin(\theta) \\ -\sin(\theta) & \cos(\theta) \end{bmatrix} \quad (28)$$

and where $\theta$ the polarization angle and $\phi$ is a random phase angle. More general forms of the rotation matrix may be used. Here, $\theta$ and $\phi$ are varied over time to achieve the different polarization angles. In one embodiment, $\theta$ and $\phi$ are varied such that all combinations of $\theta$ and $\phi$ are covered within a predefined time period. Multiple group delays $\tau_t$ (or $\tau_{\theta,\phi}$) are calculated for different polarization orientations at a single frequency $\omega_0$, and averaged over polarization orientations to calculate a mean group delay $\bar{\tau}$, which can be used as a DGD estimate for any of the applications discussed above In another embodiment, the matrix rotation R is applied to the equalizer coefficients outside the DSP 166, such as in processor 180, for the purpose of estimating the DGD.

Figure 9:
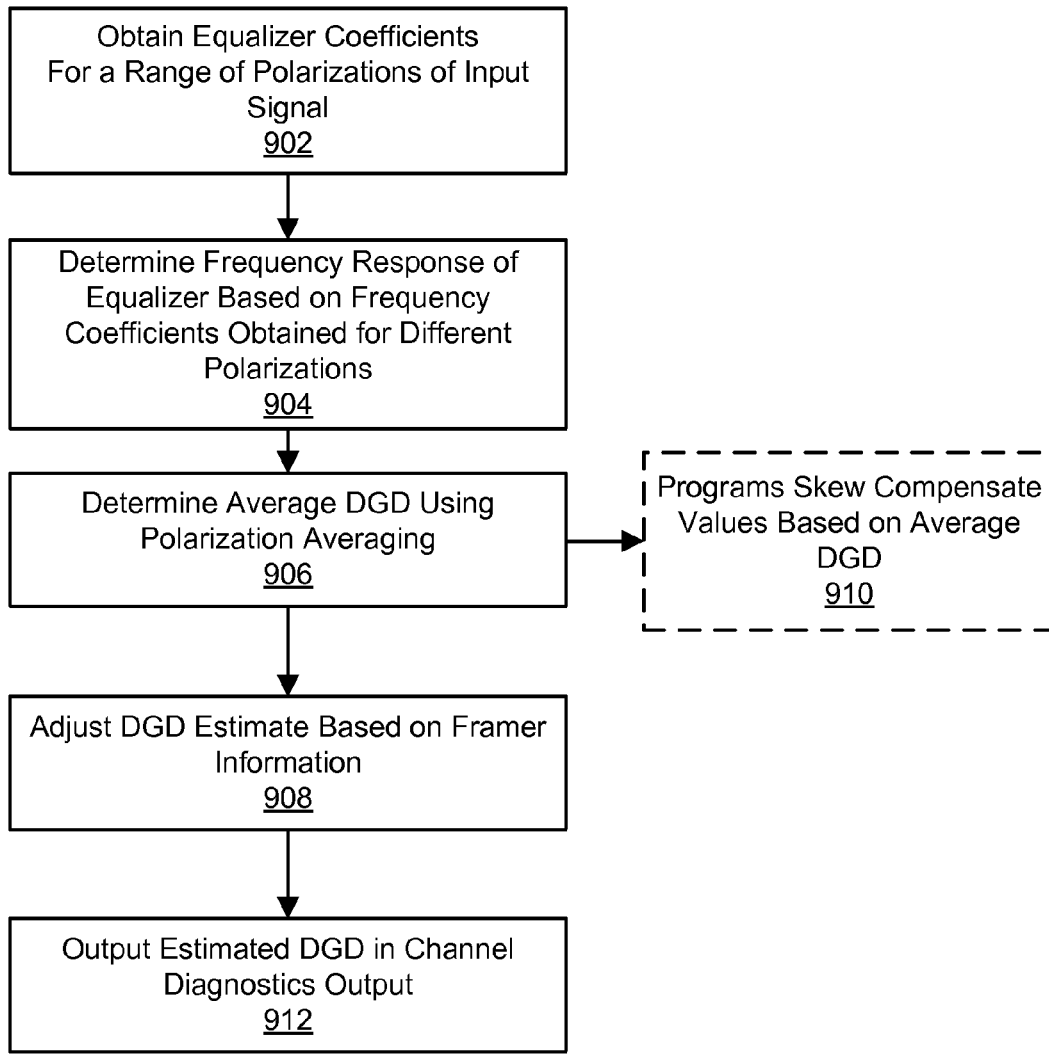
FIG. 9 is a flowchart illustrating an embodiment of a process for detecting differential group delay based on frequency coefficients in an optical communication system that uses polarization scrambling.

FIG. 9 illustrates an example embodiment of a process for detecting and compensating for DGD in a receiver 160 using polarization scrambling. The channel diagnostics block 270 obtains 902 sets of equalizer coefficients representing the different states of the adaptive equalizer for a plurality of different polarization states of the input signal. This step may be accomplished by sampling the equalizer coefficients at several points in time as the polarization scrambler 852 or matrix rotator 250 changes the polarization states over time. The channel diagnostics block 270 then determines 904 different frequency responses of the adaptive equalizer based on the different sets of equalizer coefficients captured for the different polarization states. The channel diagnostics block 270 then determines 906 the average differential group delay using polarization averaging. For example, in one embodiment, the channel diagnostics block 270 averages the calculated DGD values $\tau(\omega_0)$ in Eq. (22) obtained for the different polarization states. The DGD estimate can then be adjusted 908 based on the framer information in the same manner described above. The estimated DGD is then outputted 912 in the channel diagnostics output 260.

Optionally, the process described above can also be performed during calibration of the receiver 160. Here, the optional step 910 is added in which the channel diagnostics block 270 adjusts 910 the skew compensation values of the skew compensation block 220 to compensate for the detected DGD (e.g., by adjusting the phases of the sampling clocks of the horizontally polarized channels relative to the vertically polarized channels or vice versa).

Figure 10A:
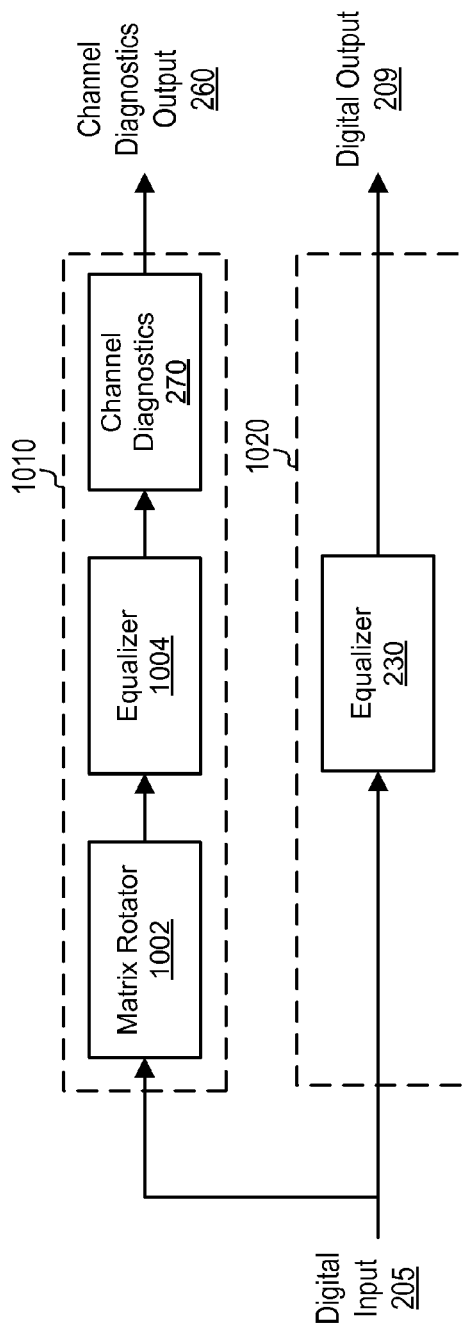
FIG. 10A is a block diagram illustrating a first example architecture of data and channel estimation paths for DGD estimation using polarization averaging.

In one embodiment, where polarization scrambling is achieved in by matrix rotation, the receiver 160 includes a separate DSP path for channel estimation that is independent from the data path. An example architecture is illustrated in FIG. 10A with a data path 1020 and channel estimation path 1010. In various embodiments, the channel estimation path 1010 may be implemented within the DSP 166 or portions of the channel estimation path 1010 may be implemented in a separate processor 180 (e.g., the channel diagnostics block 270 may be external to the DSP 166). In this embodiment, the incoming digital input 205 passes through a data path 1020 including an equalizer 230 to produce a digital output 209 in the manner described above. Additional optional components of the data path 1020 are omitted for clarity of description. In a separate parallel channel estimation path 1010, a matrix rotator 1002 applies a matrix rotation to the digital input signal 205. A second equalizer 1004 equalizes the signal using adaptive equalization, and passes the coefficients to channel diagnostics block 270 which produces the channel diagnostics output 260. This embodiment beneficially bypasses the matrix rotator 1002 in the data path 1020, thus allowing the data to be processed without the dynamic rotation affecting the digital output 209.

Figure 10B:
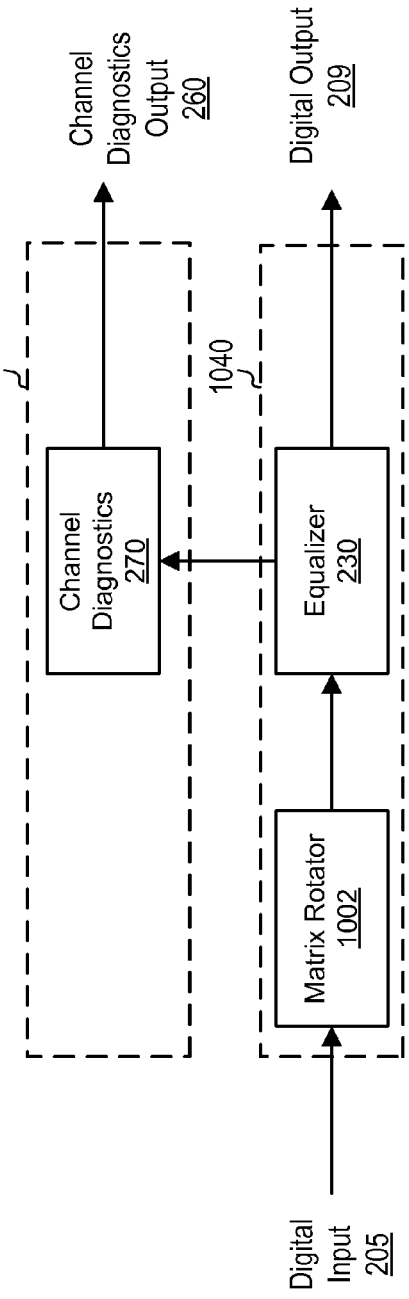
FIG. 10B is a block diagram illustrating a second example architecture of data and channel estimation paths for DGD estimation using polarization averaging.

Alternatively, in the embodiment of FIG. 10B, the matrix rotator 1002 may simply be applied prior to the equalizer 230 in the data path 1040. The channel estimation path 1030 includes the channel diagnostics block 270, which receives the equalizer coefficients directly from equalizer 230. Here, the digital output 209 is affected by the matrix rotation, but this embodiment has the benefit of having a simplified architecture relative to the embodiment of FIG. 10A.

Although the detailed description contains many specifics, these should not be construed as limiting the scope but merely as illustrating different examples and aspects of the described embodiments. It should be appreciated that the scope of the described embodiments includes other embodiments not discussed in detail above. For example, the functionality of the various components and the processes described above can be performed by hardware, firmware, software, and/or combinations thereof.

Various other modifications, changes and variations which will be apparent to those skilled in the art may be made in the arrangement, operation and details of the method and apparatus of the described embodiments disclosed herein without departing from the spirit and scope of the invention as defined in the appended claims. Therefore, the scope of the invention should be determined by the appended claims and their legal equivalents.

The invention claimed is:

1. A method for operating a digital signal processor, comprising:
   receiving a digital input vector;
   equalizing the digital signal vector using an adaptive equalizer to generate an equalized signal vector, the adaptive equalizer adaptively updating equalizer coefficients based on characteristics of the digital signal vector;
   determining a first center of gravity for equalizer coefficients corresponding to first channels of the digital input vector having a first polarization;
   comparing the first center of gravity to a first predefined range for the first center of gravity; and
   resetting the digital signal processor responsive to the first center of gravity falling outside the predefined range for the first center of gravity.

2. The method of claim 1, wherein the first polarization comprises a horizontal polarization.

3. The method of claim 1, wherein the first polarization comprises a vertical polarization.

4. The method of claim 1, further comprising:
   determining a second center of gravity for equalizer coefficients corresponding to second channels of the digital input vector having a second polarization different than the first polarization;
   comparing the second center of gravity to a second predefined range for the second center of gravity; and
   resetting the digital signal processor responsive to the second center of gravity falling outside the second predefined range for the second center of gravity.

5. A method for operating a digital signal processor, comprising:
   receiving a digital input vector;
   equalizing the digital signal vector using an adaptive equalizer to generate an equalized signal vector, the adaptive equalizer to adaptively update equalizer coefficients based on characteristics of the digital signal vector;
   determining a horizontal center of gravity for equalizer coefficients corresponding to horizontally polarized channels of the digital input vector;
   comparing the horizontal center of gravity to a predefined range for the horizontal center of gravity;
   determining a vertical center of gravity for equalizer coefficients corresponding to vertically polarized channels of the digital input vector;
   comparing the vertical center of gravity to a predefined range for the vertical center of gravity; and
   resetting the digital signal processor responsive to both of:
   (1) the horizontal center of gravity falling outside the predefined range for the horizontal center of gravity, and
   (2) the vertical center of gravity falling outside the predefined range for the vertical center of gravity.

6. The method of claim 1, further comprising:
   responsive to the first center of gravity falling within the predefined range at an initial time point, re-evaluating the first center of gravity at a subsequent time point and determining whether or not to reset the digital signal processor based on the re-evaluation.

7. The method of claim 1, further comprising:
   responsive to the first center of gravity falling within the predefined range, discontinuing further evaluations of the first center of gravity.

8. The method of claim 1, wherein resetting the digital signal processor causes the digital signal processor to restart an adaptive algorithm performed by the digital signal processor using different initial conditions.

9. A system for an optical communication system, comprising:
   a digital signal processor; and
   a non-transitory computer readable storage medium storing computer-executable instructions, the instructions when executed causing the digital signal processor to perform steps including:
   receiving a digital input vector;
   equalizing the digital signal vector using an adaptive equalizer to generate an equalized signal vector, the adaptive equalizer adaptively updating equalizer coefficients based on characteristics of the digital signal vector;
   determining a first center of gravity for equalizer coefficients corresponding to first channels of the digital input vector having a first polarization;
   comparing the first center of gravity to a first predefined range for the first center of gravity; and
   resetting the digital signal processor responsive to the first center of gravity falling outside the predefined range for the first center of gravity.

10. The system of claim 9, wherein the first polarization comprises a horizontal polarization.

11. The system of claim 9, wherein the first polarization comprises a vertical polarization.

12. The system of claim 9, further comprising:
    determining a second center of gravity for equalizer coefficients corresponding to second channels of the digital input vector having a second polarization different than the first polarization;
    comparing the second center of gravity to a second predefined range for the second center of gravity; and
    resetting the digital signal processor responsive to the second center of gravity falling outside the second predefined range for the second center of gravity.

13. A system for an optical communication system, comprising:
    a digital signal processor; and
    a non-transitory computer readable storage medium storing computer-executable instructions, the instructions when executed causing the digital signal processor to perform steps including:
    determining a horizontal center of gravity for equalizer coefficients corresponding to horizontally polarized channels of the digital input vector;
    comparing the horizontal center of gravity to a predefined range for the horizontal center of gravity;
    determining a vertical center of gravity for equalizer coefficients corresponding to vertically polarized channels of the digital input vector;

comparing the vertical center of gravity to a predefined range for the vertical center of gravity; and resetting the digital signal processor responsive to both of: (1) the horizontal center of gravity falling outside the predefined range for the horizontal center of gravity, and (2) the vertical center of gravity falling outside the predefined range for the vertical center of gravity.

14. The system of claim 9, wherein the computer-executable instructions further cause the digital signal processor to perform steps including:

responsive to the first center of gravity falling within the predefined range at an initial time point, re-evaluating the first center of gravity at a subsequent time point and determining whether or not to reset the digital signal processor based on the re-evaluation.

15. The system of claim 9, wherein the computer-executable instructions further cause the digital signal processor to perform steps including:

responsive to the first center of gravity falling within the predefined range, discontinuing further evaluations of the first center of gravity.

16. The system of claim 9, wherein resetting the digital signal processor causes the digital signal processor to restart an adaptive algorithm performed by the digital signal processor using different initial conditions.

* * * * *